(12) United States Patent
Suzuki

(10) Patent No.: US 11,269,191 B2
(45) Date of Patent: Mar. 8, 2022

(54) DATA ACQUISITION APPARATUS

(71) Applicant: OLYMPUS CORPORATION, Tokyo (JP)

(72) Inventor: Yoshimasa Suzuki, Kawasaki (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 17/149,357

(22) Filed: Jan. 14, 2021

(65) Prior Publication Data

US 2021/0247619 A1 Aug. 12, 2021

Related U.S. Application Data

(63) Continuation of application No. PCT/JP2018/026908, filed on Jul. 18, 2018.

(51) Int. Cl.
*G02B 27/14* (2006.01)
*G02B 6/42* (2006.01)
*G02B 27/10* (2006.01)

(52) U.S. Cl.
CPC ......... *G02B 27/144* (2013.01); *G02B 6/4201* (2013.01); *G02B 27/1006* (2013.01)

(58) Field of Classification Search
CPC ............ G01B 9/02024; G01B 9/02032; G01B 9/02047; G02B 21/14; G02B 27/1006;
(Continued)

(56) References Cited

U.S. PATENT DOCUMENTS 4,810,094 A 3/1989 Witherow et al.
8,213,022 B1 * 7/2012 Riza ..................... G01B 11/24
356/609
(Continued)

FOREIGN PATENT DOCUMENTS

JP 2013-231716 A 11/2013
JP 2014-44095 A 3/2014
(Continued)

OTHER PUBLICATIONS

Kamilov U.S. et al., "Learning Approach to Optical Tomography", Optica 2(6):517-527 (Jun. 2015) (cited in ISR & Written Opinion).
(Continued)

*Primary Examiner* — Joseph P Martinez
*Assistant Examiner* — Vipin Patel
(74) *Attorney, Agent, or Firm* — Scully, Scott, Murphy & Presser, P.C.

(57) ABSTRACT

A data acquisition apparatus includes an illumination device, a first beam splitter, a measurement unit, and a photodetector. A measurement optical path and a reference optical path are positioned between the illumination device and the photodetector. In the first beam splitter, light traveling in a first direction and light traveling in a second direction are generated from incident light. The measurement optical path is positioned in the first direction, the reference optical path is positioned in the second direction, and the measurement unit is disposed on the measurement optical path. In the optical surface of the first beam splitter, an incident position of light emitted from the illumination device changes with time, and the angle formed by light propagating through the measurement optical path and the optical axis of the measurement optical path changes with change in the incident position.

8 Claims, 14 Drawing Sheets

(58) Field of Classification Search
CPC ...... G02B 27/144; G02B 6/0008; G02B 6/04; G02B 6/4201; G03H 1/0443
See application file for complete search history.

(56) References Cited

U.S. PATENT DOCUMENTS

| | | |
|---|---|---|
| 8,937,722 B2 | 1/2015 | Cotte et al. |
| 2013/0057869 A1 | 3/2013 | Cotte |
| 2013/0286403 A1 | 10/2013 | Matsubara et al. |
| 2018/0073865 A1 | 3/2018 | Suzuki et al. |
| 2018/0164571 A1 | 6/2018 | Ouchi |

FOREIGN PATENT DOCUMENTS

| | | |
|---|---|---|
| WO | 2016/185729 A1 | 11/2016 |
| WO | 2016/199179 A1 | 12/2016 |

OTHER PUBLICATIONS

International Search Report dated Oct. 16, 2018 received in International Application No. PCT/JP2018/026908, together with an English-language translation.
Written Opinion of the International Searching Authority dated Oct. 16, 2018 received in International Application No. PCT/JP2018/026908.
International Search Report dated Jan. 28, 2021 issued in PCT/JP2018/026908, 11 pages.

\* cited by examiner

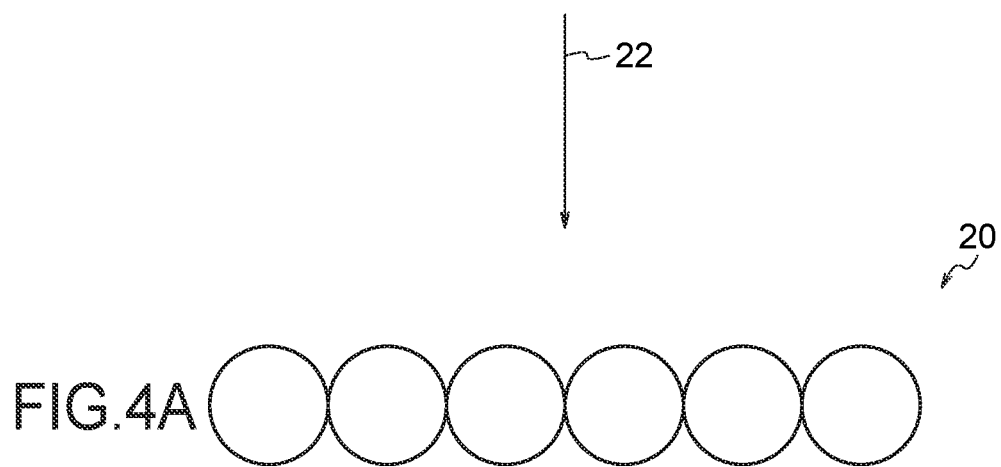

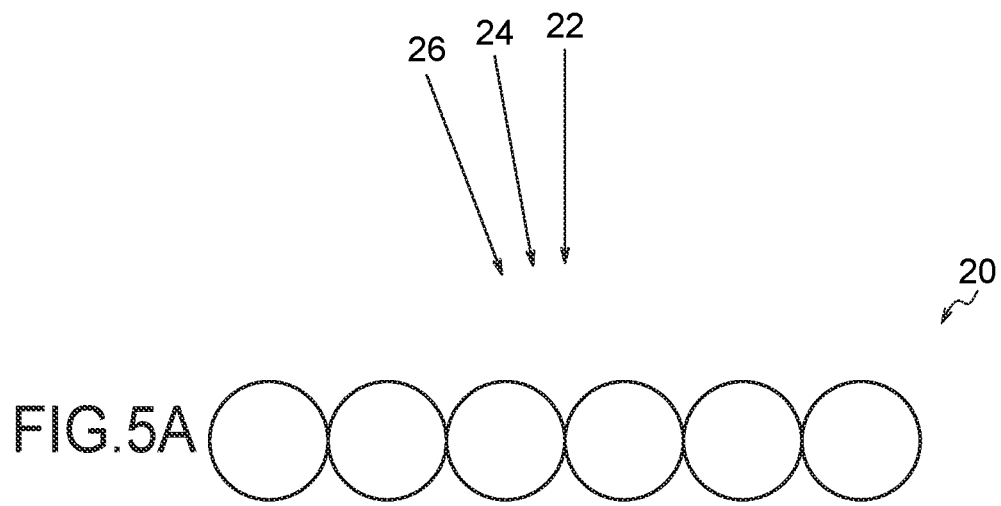
FIG.5A
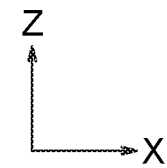
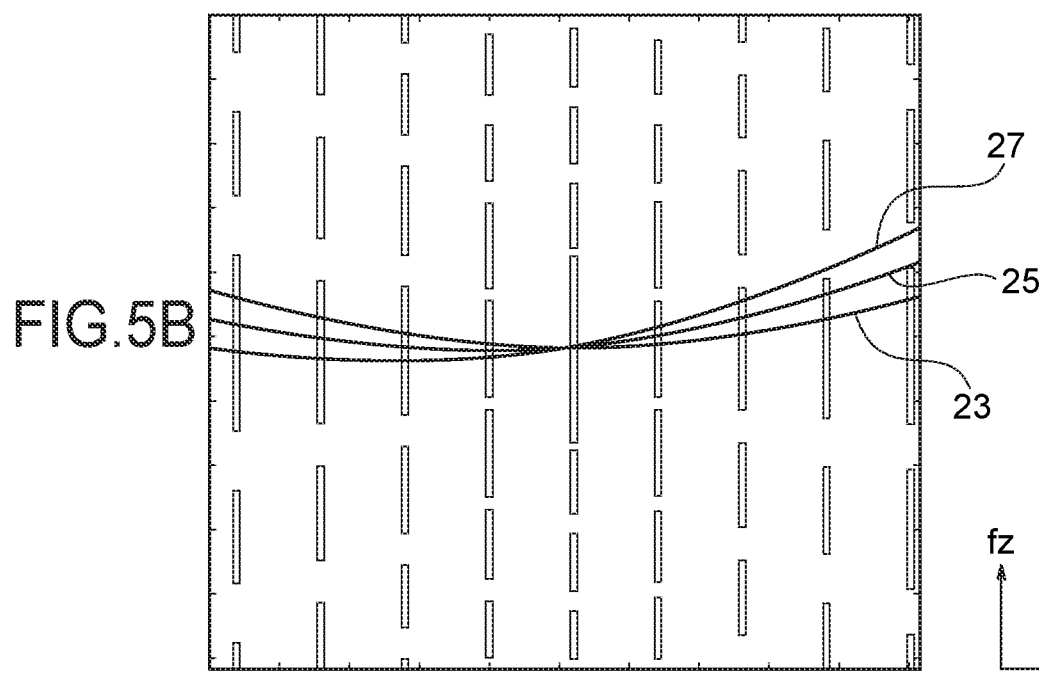
FIG.5B

FIG.6A
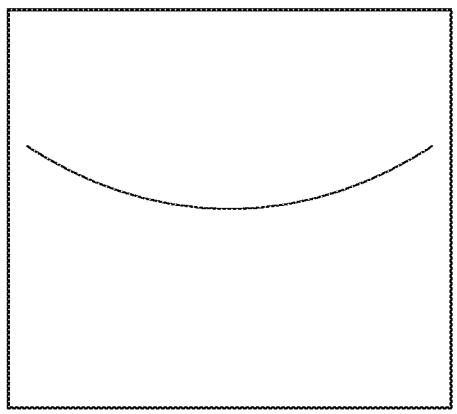
FIG.6B
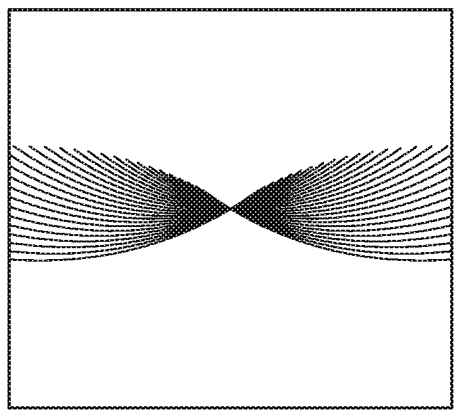
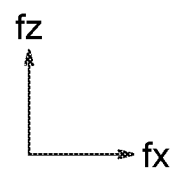
FIG.6C
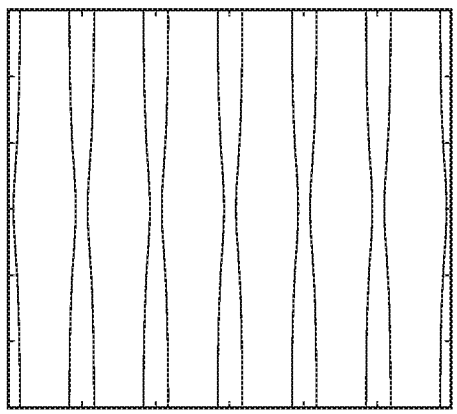
FIG.6D
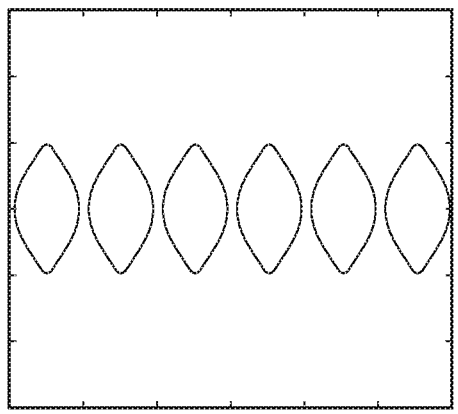
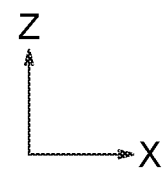

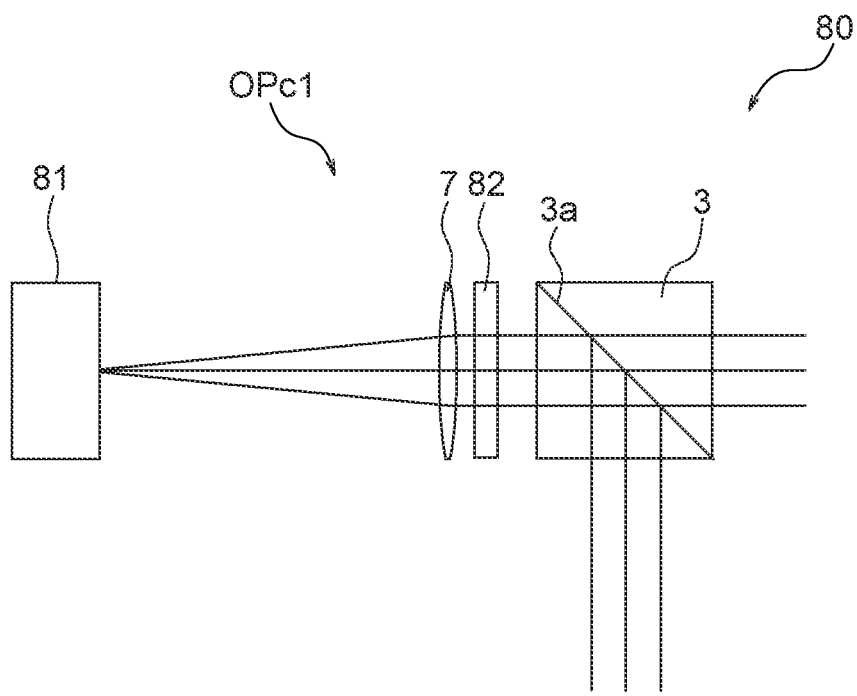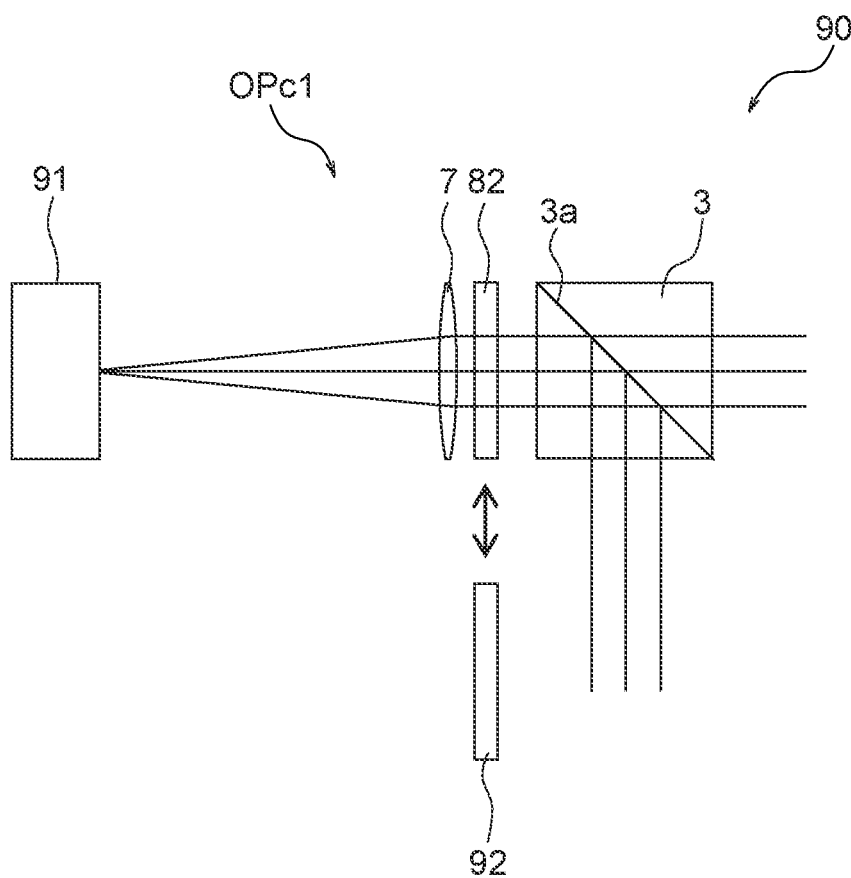

FIG.12A
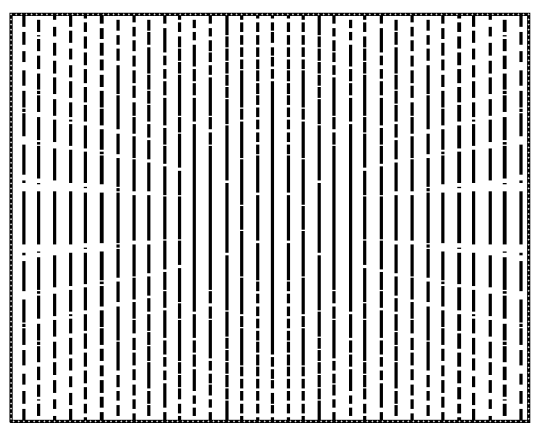
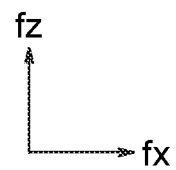
FIG.12B
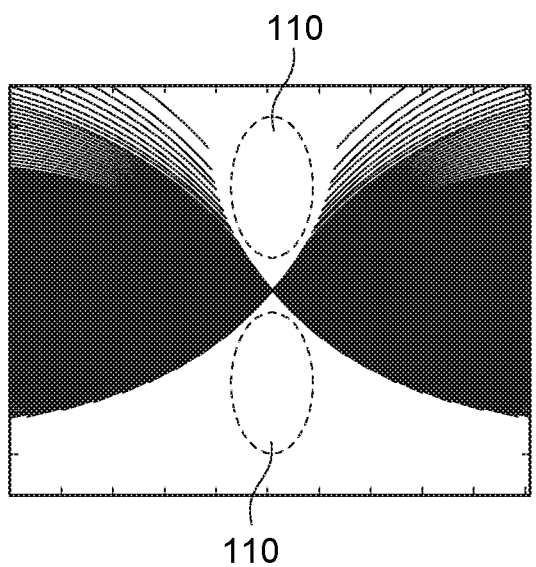
FIG.12C
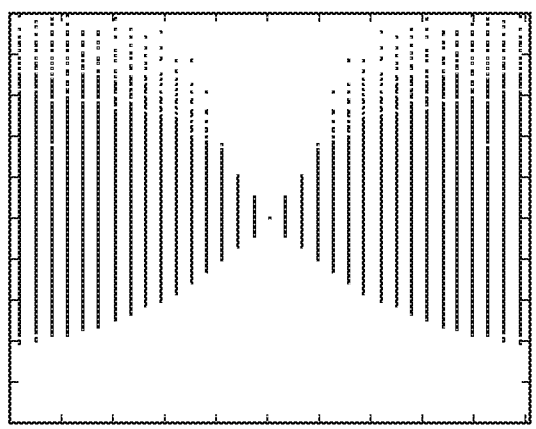

FIG.14A
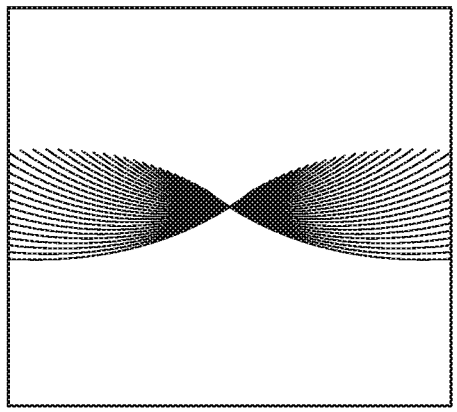
FIG.14B
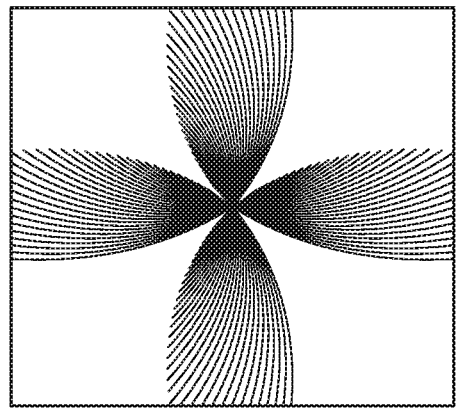
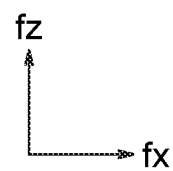
FIG.14C
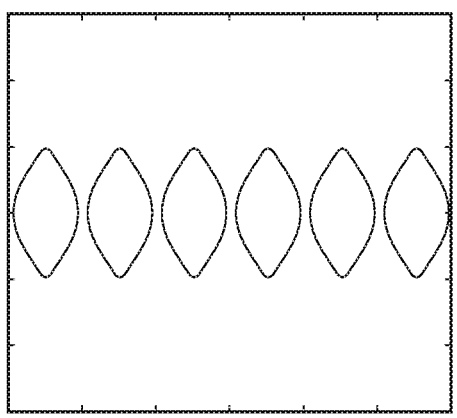
FIG.14D
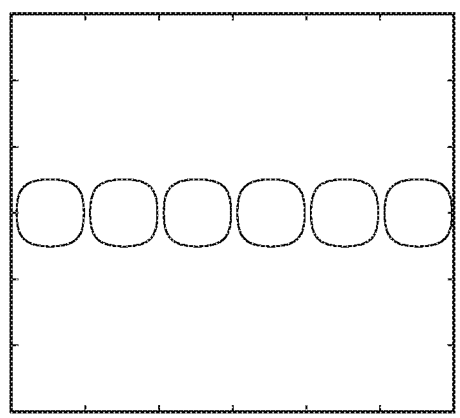
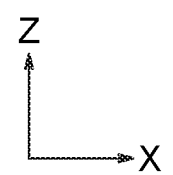

DATA ACQUISITION APPARATUS

CROSS-REFERENCE TO RELATED APPLICATION

The present application is a continuation application of International Application No. PCT/JP2018/026908 filed on Jul. 18, 2018, the entire contents of which are incorporated herein by reference.

BACKGROUND

Technical Field

The present disclosure relates to a data acquisition apparatus, specifically to an apparatus that acquires data to be used in calculation of a refractive index.

Description of the Related Art

An apparatus for acquiring an image of a minute object with a high resolution is disclosed in ULUGBEK S. KAMILOV ET AL, "Learning approach to optical tomography", Optica, June 2015, Vol. 2, No. 6, 517-522 and U.S. Pat. No. 8,937,722.

In "Learning approach to optical tomography", the apparatus includes a reference optical path and a signal optical path. Lenses are disposed on the reference optical path. Two objective lenses are disposed on the signal optical path. The two objective lenses are disposed with a sample interposed therebetween. A rotating mirror is disposed on the signal optical path. An angle of light irradiated on the sample is changed by the rotating mirror.

Light transmitted through the sample is detected together with light on the reference optical path by a photodetector. A hologram is formed by the light transmitted through the sample and the light on the reference optical path. The light transmitted through the sample includes scattering light produced at the sample. Therefore, information on scattering light is also included in the hologram. Using this hologram, a three-dimensional distribution of the refractive index in the sample is calculated.

In U.S. Pat. No. 8,937,722, the apparatus has two optical paths. A pinhole and a lens are disposed on one of the optical paths. A condenser lens and an objective lens are disposed on the other optical path. The condenser lens and the objective lens are disposed with a sample interposed therebetween. A wedge prism is disposed on the signal optical path. With rotation of the wedge prism, the angle of light irradiated on the sample is changed.

U.S. Pat. No. 8,937,722 discloses a method of improving the resolution of an image of a minute object. The disclosed method includes a step of measuring a wave field scattered by the minute object. The measured wave field is deconvolved by a coherent transfer function, whereby a scattering potential is obtained. This scattering potential is obtained for each angle of light irradiated on the sample and synthesized on a Fourier plane, whereby the resolution of the image is improved.

Expression (30) is also disclosed. Expression (30) includes the function F(K) and n(r). The function F(K) is the scattering potential, and n (r) is the complex refractive index. Expression (30) indicates that the refractive index is obtained from the scattering potential.

SUMMARY

A data acquisition apparatus according to some embodiments of the present disclosure includes an illumination device, a first beam splitter, a measurement unit, and a photodetector, wherein a measurement optical path and a reference optical path are positioned between the illumination device and the photodetector, the first beam splitter has an optical surface in which an optical film is formed, in the first beam splitter, light traveling in a first direction and light traveling in a second direction are generated from incident light by the optical film, the measurement optical path is positioned in the first direction, the reference optical path is positioned in the second direction, the measurement unit is disposed on the measurement optical path, in the optical surface of the first beam splitter, an incident position of light emitted from the illumination device changes with time, and with change in the incident position, an angle formed by light traveling through the measurement optical path and an optical axis of the measurement optical path changes.

BRIEF DESCRIPTION OF THE DRAWINGS

FIG. 4A and FIG. 4B are diagrams illustrating the relation between the direction of measurement light and the position of a spherical shell of the Ewald sphere;

FIG. 5A and FIG. 5B are diagrams illustrating the relation between the direction of measurement light and the position of a spherical shell of the Ewald sphere;

FIG. 6A, FIG. 6B, FIG. 6C, and FIG. 6D are diagrams illustrating the relation between an acquisition range of the scattering potential and the shape of a sample;

FIG. 10A and FIG. 10B are diagrams illustrating modifications of the data acquisition apparatus;

FIG. 12A, FIG. 12B, and FIG. 12C are diagrams illustrating the relation between the scattering potential and an acquisition range of the scattering potential;

FIG. 14A, FIG. 14B, FIG. 14C, and FIG. 14D are diagrams illustrating the relation between an acquisition range of the scattering potential and the shape of a sample.

DETAILED DESCRIPTION

Prior to description of examples, the operation and effect of embodiments according to an aspect of the present disclosure will be described. The operation and effect of the present embodiment will be specifically described with specific examples. However, similarly to the examples described later, the illustrated aspects of the examples are only some of the aspects included in the present disclosure and the aspects of the disclosure include many other variations. The present disclosure therefore is not limited to the illustrated aspects.

A data acquisition apparatus of the present embodiment includes an illumination device, a first beam splitter, a measurement unit, and a photodetector. A measurement optical path and a reference optical path are positioned between the illumination device and the photodetector. The first beam splitter has an optical surface in which an optical film is formed, and in the first beam splitter, light traveling in a first direction and light traveling in a second direction are generated from incident light by the optical film. The measurement optical path is positioned in the first direction, the reference optical path is positioned in the second direction, and the measurement unit is disposed on the measurement optical path. In the optical surface of the first beam splitter, an incident position of light emitted from the illumination device changes with time, and with the change in incident position, the angle formed by light traveling through the measurement optical path and the optical axis of the measurement optical path changes.

Figure 1:
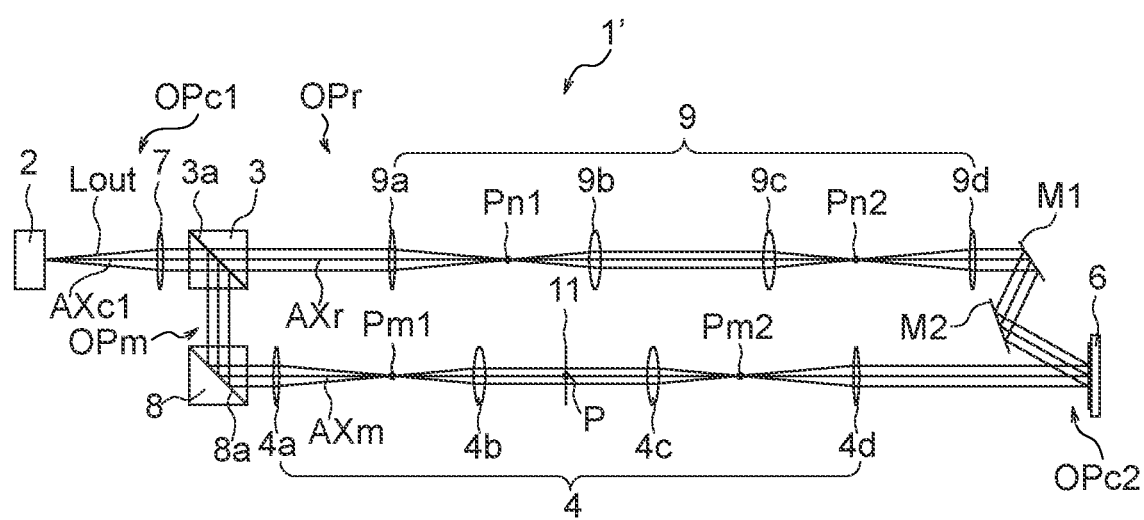
FIG. 1 is a diagram illustrating a data acquisition apparatus of the present embodiment.

The data acquisition apparatus of the present embodiment is illustrated in FIG. 1. The configuration and operation of the data acquisition apparatus will be described in detail with the data acquisition apparatus illustrated in FIG. 2A and FIG. 2B.

A data acquisition apparatus 1' includes an illumination device 2, a first beam splitter 3, a measurement unit 4, and a photodetector 6. In the data acquisition apparatus 1', a measurement optical path and a reference optical path are positioned between the illumination device 2 and the photodetector 6.

The first beam splitter 3 has an optical surface 3a in which an optical film is formed. In the first beam splitter 3, light traveling in a first direction and light traveling in a second direction are generated from incident light by the optical film. The measurement optical path is positioned in the first direction. The reference optical path is positioned in the second direction.

The measurement unit 4 is disposed on the measurement optical path. The light traveling in the first direction passes through the measurement unit 4 and thereafter is incident on the photodetector 6.

A reference unit 9, a mirror M1, and a mirror M2 are disposed on the reference optical path. The light traveling in the second direction passes through the reference unit 9 and thereafter is incident on the mirror M1. The light incident on the mirror M1 is reflected by the mirror M1 and the mirror M2. The light reflected by the mirror M2 is incident on the photodetector 6.

In the optical surface 3a of the first beam splitter 3, the incident position of light emitted from the illumination device 2 changes with time. Then, with change in the incident position, the angle formed by light traveling through the measurement optical path and the optical axis of the measurement optical path changes.

Light passing through the measurement unit 4 and light passing through the reference unit 9 are incident at the same place in the photodetector 6. As a result, interference fringes are formed on a detection surface of the photodetector 6. It is possible to acquire a scattering potential by analyzing the interference fringes. A refractive index is obtained from the scattering potential.

It is preferable that the data acquisition apparatus of the present embodiment further include a second beam splitter, the second beam splitter have an optical surface in which an optical film is formed, light traveling in the first direction be measurement light, light traveling in the second direction be reference light, the second beam splitter be disposed at a position where the measurement optical path and the reference optical path intersect with each other, the measurement light and the reference light be incident on the second beam splitter, and the measurement light and the reference light be emerged from the second beam splitter toward the photodetector.

Figure 2A:
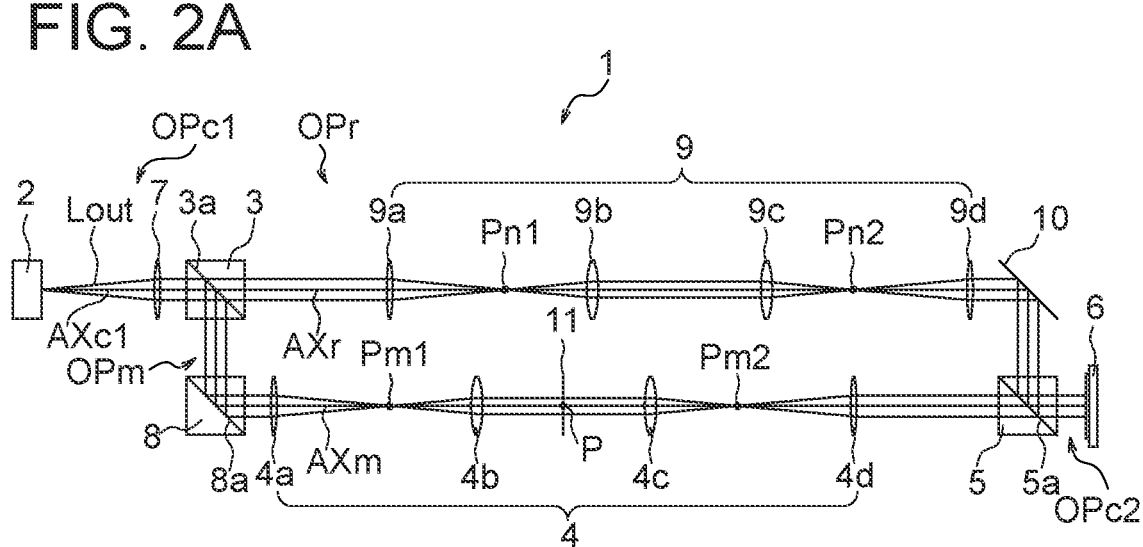
FIG. 2A and FIG. 2B are diagrams illustrating a data acquisition apparatus of the present embodiment.
Figure 2B:
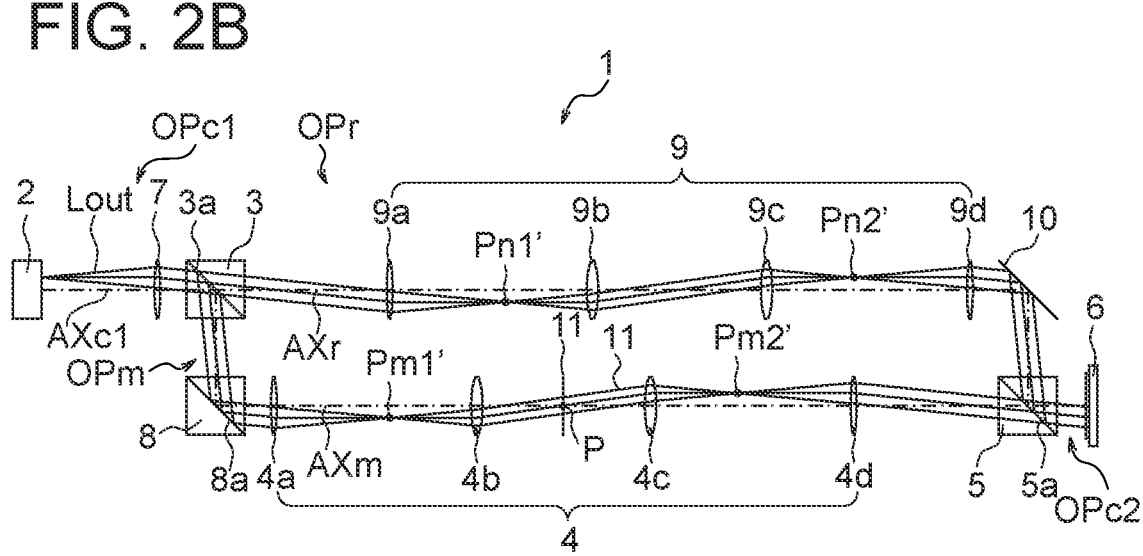

The data acquisition apparatus of the present embodiment is illustrated in FIG. 2A and FIG. 2B. FIG. 2A is a diagram illustrating the data acquisition apparatus in a first state, and FIG. 2B is a diagram illustrating the data acquisition apparatus in a second state.

A data acquisition apparatus 1 includes an illumination device 2, a first beam splitter 3, a measurement unit 4, a second beam splitter 5, and a photodetector 6.

Light emitted from the illumination device 2 (hereinafter referred to as "emitted light Lout") travels through an optical path (hereinafter referred to as "common optical path OPc1") from the illumination device 2 to the first beam splitter 3 and is incident on the first beam splitter 3. An optical axis AXc1 is the optical axis of the common optical path OPc1.

The first beam splitter 3 has an optical surface 3a in which an optical film is formed. In the first beam splitter 3, light traveling in a first direction and light traveling in a second direction are generated from incident light by the optical film.

An optical path is positioned in each of the first direction and the second direction. An optical path positioned in the first direction is an optical path for measurement (hereinafter referred to as "measurement optical path OPm"). An optical path positioned in the second direction is an optical path for reference (hereinafter referred to as "reference optical path OPr"). In the data acquisition apparatus 1, the measurement optical path OPm and the reference optical path OPr are positioned between the illumination device 2 and the photodetector 6.

In the first beam splitter 3, reflected light and transmitted light are generated by the optical film. In the data acquisition apparatus 1, the reflected light corresponds to the light traveling in the first direction, and the transmitted light corresponds to the light traveling in the second direction.

The first direction and the second direction intersect with each other. In the data acquisition apparatus 1, the angle formed by the normal to the optical surface 3a and the optical axis AXc1 is 45°. Thus, the first direction and the second direction are orthogonal to each other.

The measurement optical path OPm is positioned in the first direction. Thus, the measurement optical path OPm is positioned on the reflection side of the first beam splitter 3. The reference optical path OPr is positioned in the second direction. Thus, the reference optical path OPr is positioned on the transmission side of the first beam splitter 3.

In the foregoing description, the reflected light generated by the optical surface 3a corresponds to the light traveling in the first direction. The transmitted light generated by the optical surface 3a corresponds to the light traveling in the second direction. Thus, the measurement optical path OPm is positioned on the reflection side of the first beam splitter 3, and the reference optical path OPr is positioned on the transmission side of the first beam splitter 3.

However, the reflected light generated by the optical surface 3a may correspond to the light traveling in the second direction. Furthermore, the transmitted light generated by the optical surface 3a may correspond to the light traveling in the first direction. In this case, the reference optical path OPr is positioned on the reflection side of the first beam splitter 3, and the measurement optical path OPm is positioned on the transmission side of the first beam splitter 3.

The measurement unit 4 is disposed on the measurement optical path OPm. The light traveling in the first direction is incident on the measurement unit 4 and thereafter emerged from the measurement unit 4. The light emerged from the measurement unit 4 is incident on the second beam splitter 5.

The second beam splitter 5 has an optical surface 5a in which an optical film is formed. In the second beam splitter 5, two light beams are generated from incident light by the optical film. One of the two light beams is incident on the photodetector 6.

The data acquisition apparatus 1 will be described in more detail. In the data acquisition apparatus 1, a lens 7, a mirror 8, a reference unit 9, and a mirror 10 are disposed.

The lens 7 is disposed on the common optical path OPc1. The mirror 8 is disposed on the measurement optical path OPm. The reference unit 9 and the mirror 10 are disposed on the reference optical path OPr.

The emitted light Lout may be light considered as light emitted from a point light source. When the area of a region from which the emitted light Lout is emitted (hereinafter referred to as "light-emitting portion") is sufficiently small, the emitted light Lout can be considered as light emitted from a point light source. Thus, the emitted light Lout is not necessarily light emitted from a point light source.

In the light-emitting portion, the light-emitting portion itself may emit light or the light-emitting portion itself may not necessarily emit light. When the light-emitting portion itself does not emit light, for example, a facet of an optical fiber or an aperture of a pinhole is used as the light-emitting portion. In this case, it is possible to use a surface light source as a light source.

By making such that the focal position of the lens 7 is coincident with the light-emitting portion, parallel light beam is emerged from the lens 7. The parallel light beam emerged from the lens 7 is incident on the first beam splitter 3. In the first beam splitter 3, reflected light and transmitted light are generated by the optical surface 3a.

The reflected light generated by the optical surface 3a travels through the measurement optical path OPm positioned in the first direction. The transmitted light generated by the optical surface 3a travels through the reference optical path OPr positioned in the second direction.

The mirror 8 is disposed on the measurement optical path OPm. The mirror 8 is disposed between the first beam splitter 3 and the measurement unit 4. The reflected light generated by the optical surface 3a is incident on the mirror 8.

In the data acquisition apparatus 1, the mirror 8 is formed with two prisms. A reflective film is formed on a cemented surface 8a of the two prisms. The angle formed by the normal to the cemented surface 8a of the mirror 8 and an optical axis AXm is 45°. The mirror 8 reflects the reflected light generated by the optical surface 3a toward the measurement unit 4.

Light emerged from the measurement unit 4 is incident on the second beam splitter 5. Light emerged from the second beam splitter 5 is incident on the photodetector 6.

The reference unit 9 and the mirror 10 are disposed on the reference optical path OPr. The reference unit 9 and the mirror 10 are disposed between the first beam splitter 3 and the second beam splitter 5.

The transmitted light generated by the optical surface 3a is incident on the reference unit 9. Light emerged from the reference unit 9 is incident on the mirror 10.

In the data acquisition apparatus 1, the mirror 10 is formed with a parallel flat plate. The angle formed by the normal to the reflecting surface of the mirror 10 and an optical axis AXr is 45°. The mirror 10 reflects light emerged from the reference unit 9 toward the second beam splitter 5.

Light reflected by the optical surface 5a of the second beam splitter 5 is incident on the photodetector 6. The angle formed by the normal to the optical surface 5a and the optical axis AXm is 45°.

A mirror formed with a parallel flat plate, like the mirror 10, may be used for the mirror 8. A mirror formed with two prisms, like the mirror 8, may be used for the mirror 10.

In the data acquisition apparatus 1, the first state and the second state occur. The first state and the second state are described.

The illumination device 2 has the light-emitting portion. As described above, the area of the light-emitting portion is sufficiently small. Thus, when the position of the light-emitting portion is changed in a predetermined plane, the emission position of the emitted light Lout changes. The predetermined plane is a plane orthogonal to the optical axis AXc1.

In the first state, as illustrated in FIG. 2A, the light-emitting portion is positioned on the optical axis AXc1. Furthermore, from the illumination device 2 to the lens 7, the central ray of the emitted light Lout is parallel to the optical axis AXc1 and overlaps the optical axis AXc1.

In comparison, in the second state, as illustrated in FIG. 2B, the light-emitting portion is not positioned on the optical axis AXc1 but positioned away from the optical axis AXc1. Furthermore, from the illumination device 2 to the lens 7, the central ray of the emitted light Lout is parallel to the optical axis AXc1 but positioned away from the optical axis AXc1.

As described above, a parallel light beam is emerged from the lens 7. The parallel light beam emerged from the lens 7 is incident on the first beam splitter 3 and reaches the optical surface 3a.

In the first state, from the lens 7 to the first beam splitter 3, the central ray of the parallel light beam is parallel to the optical axis AXc1 and overlaps the optical axis AXc1. Furthermore, in the optical surface 3a, the center of the parallel light beam is coincident with the optical axis AXc1.

In comparison, in the second state, from the lens 7 to the first beam splitter 3, the central ray of the parallel light beam is inclined relative to the optical axis AXc1 and positioned away from the optical axis AXc1. Furthermore, in the optical surface 3a, the center of the parallel light beam is not coincident with the optical axis AXc1 but positioned away from the optical axis AXc1.

When the angle formed by the parallel light beam and the optical axis AXc1 is $\theta c$, $\theta c=0'$ in the first state. In comparison, in the second state, $\theta c \neq 0°$. Furthermore, when a shift length of the parallel light beam from the optical axis AXc1 is $\Delta c$, $\Delta c=0$ mm in the first state. In comparison, in the second state, $\Delta c \neq 0$ mm.

With change from the first state to the second state or change from the second state to the first state, the value of θc changes. When the value of θc changes, the value of Δc changes. Furthermore, as the value of θc increases, the value of Δc also increases.

As just described, in the data acquisition apparatus 1, the incident position of light emitted from the illumination device 2 changes with time in the optical surface 3a of the first beam splitter 3.

The number of states is not limited to two. For example, a third state may be produced. In this case, the value of Δc in the third state differs from the value of Δc in the first state and the value of Δc in the second state.

Both in the first state and in the second state, in the first beam splitter 3, two parallel light beams are generated from the parallel light beam incident on the optical surface 3a. That is, in the first beam splitter 3, a parallel light beam reflected by the optical surface 3a and a parallel light beam transmitted through the optical surface 3a are generated.

The parallel light beam reflected by the optical surface 3a is a parallel light beam traveling in the first direction. The parallel light beam traveling in the first direction is light for measurement (hereinafter referred to as "measurement light Lme1"). The parallel light beam transmitted through the optical surface 3a is a parallel light beam traveling in the second direction. The parallel light beam traveling in the second direction is light for reference (hereinafter referred to as "reference light Lref").

The measurement light Lme1 is described. The measurement light Lme1 is incident on the mirror 8 and reflected by a reflective film formed on the cemented surface 8a. The measurement light Lme1 is incident on the measurement unit 4. In the measurement unit 4, an imaging lens 4a, an objective lens 4b, an objective lens 4c, and an imaging lens 4d are disposed along the optical axis of the measurement optical path OPm (hereinafter referred to as "optical axis AXm").

An illumination optical system is formed by the imaging lens 4a and the objective lens 4b. A detection optical system is formed by the objective lens 4c and the imaging lens 4d. In the measurement unit 4, the illumination optical system and the detection optical system face each other with a point P interposed therebetween.

The measurement light Lme1 is incident on the imaging lens 4a and collected by the imaging lens 4a. In the first state, the measurement light Lme1 is collected at a focal point Pm1 on the optical axis AXm. On the other hand, in the second state, the measurement light Lme1 is collected at a focal point Pm1' at a distance from the optical axis AXm.

The measurement light Lme1 incident on the imaging lens 4a is a parallel light beam. Thus, the measurement light Lme1 is collected at the focal position of the imaging lens 4a. The focal point Pm1 and the focal point Pm1' are positioned on the focal plane of the imaging lens 4a.

The measurement light Lme1 collected on the focal plane of the imaging lens 4a is incident on the objective lens 4b while diverging. In the measurement unit 4, the focal position of the imaging lens 4a is coincident with the focal position of the objective lens 4b. Thus, both of the measurement light Lme1 incident on the objective lens 4b from the focal point Pm1 and the measurement light Lme1 incident on the objective lens 4b from the focal point Pm1' are collimated and emerged from the objective lens 4b. The measurement light Lme1 emerged from the objective lens 4b is directed toward the objective lens 4c.

In the first state, the focal point Pm1 is positioned on the optical axis AXm. Furthermore, from the objective lens 4b to the objective lens 4c, the central ray of the measurement light Lme1 is parallel to the optical axis AXm and overlaps the optical axis AXm.

In comparison, in the second state, the focal point Pm1' is not positioned on the optical axis AXm but positioned away from the optical axis AXm. Furthermore, from the objective lens 4b to the objective lens 4c, the central ray of the measurement light Lme1 is inclined relative to the optical axis AXm and intersects the optical axis AXm at the point P.

When a shift length of the focal point from the optical axis AXm is Δm, Δm=0 mm in the first state. In comparison, in the second state, Δm≠0 mm. When the angle formed by the parallel light beam emerged from the objective lens 4b and the optical axis AXm is θm, θm=0° in the first state. In comparison, in the second state, θm=0°.

With change from the first state to the second state or change from the second state to the first state, the value of Δm changes. When the value of Δm changes, the value of θm changes. Furthermore, as the value of μm increases, the value of θm also increases.

The change in θm occurs due to the change in Δm. The change in Δm is change in shift length of the focal point from the optical axis AXm. The focal point Pm1 and the focal point Pm1' are points at which the parallel light beam reflected by the optical surface 3a is collected.

As described above, in the optical surface 3a, the incident position of light emitted from the illumination device 2 changes in the first state and the second state. Thus, the change in θm, that is, the change in angle formed by the parallel light beam emerged from the objective lens 4b and the optical axis AXm is caused by change in incident position of the parallel light beam in the optical surface 3a.

As just described, in the data acquisition apparatus 1, the angle formed by light traveling through the measurement optical path OPm and the optical axis AXm changes with change in incident position.

It is possible to dispose a sample 11 at the point P. In the data acquisition apparatus 1, the angle of measurement light irradiated on the sample 11 can be changed.

The sample 11 is, for example, a living cell. Since the living cell is colorless transparent, the measurement light Lme1 is transmitted through the sample 11. At this moment, the measurement light Lme1 is affected by the sample 11. As a result, scattering light is emerged from the sample 11.

Measurement light including scattering light (hereinafter referred to as "measurement light Lme1'") is incident on the objective lens 4c. The measurement light Lme1' is collected by the objective lens 4c. In the first state, the measurement light Lme1' is collected at a focal point Pm2 on the optical axis AXm. On the other hand, in the second state, the measurement light Lme1' is collected at a focal point Pm2' at a distance from the optical axis AXm.

The measurement light Lme1' incident on the objective lens 4c is a parallel light beam. Thus, the measurement light Lme1' is collected at the focal position of the objective lens 4c. The focal point Pm2 and the focal point Pm2' are positioned on the focal plane of the objective lens 4c.

The measurement light Lme1' collected on the focal plane of the objective lens 4c is incident on the imaging lens 4d while diverging. In the measurement unit 4, the focal position of the objective lens 4c is coincident with the focal position of the imaging lens 4d. Thus, both of the measurement light Lme1' incident on the imaging lens 4d from the focal point Pm2 and the measurement light Lme1' incident on the imaging lens 4d from the focal point Pm2' are collimated and emerged from the imaging lens 4d.

The measurement light Lme1' emerged from the imaging lens 4d is incident on the second beam splitter 5. In the second beam splitter 5, part of the measurement light Lme1' is reflected by the optical film and the rest is transmitted through the optical film. The measurement light Lme1' transmitted through the second beam splitter 5 is incident on the photodetector 6.

The reference light Lref is described. The reference light Lref is incident on the reference unit 9. For the optical system of the reference unit 9, the same optical system as the optical system of the measurement unit 4 may be used, or an optical system different from the optical system of the measurement unit 4 may be used. In the data acquisition apparatus 1, the same optical system as the optical system of the measurement unit 4 is used for the optical system of the reference unit 9.

In the reference unit 9, an imaging lens 9a, an objective lens 9b, an objective lens 9c, and an imaging lens 9d are disposed along the optical axis of the reference optical path OPr (hereinafter referred to as "optical axis AXr").

The reference light Lref is incident on the imaging lens 9a and collected by the imaging lens 9a. In the first state, the reference light Lref is collected at a focal point Pn1 on the optical axis AXr. On the other hand, in the second state, the reference light Lref is collected at a focal point Pn1' at a distance from the optical axis AXr.

The reference light Lref incident on the imaging lens 9a is a parallel light beam. Thus, the reference light Lref is collected at the focal position of the imaging lens 9a. The focal point Pn1 and the focal point Pn1' are positioned on the focal plane of the imaging lens 9a.

The reference light Lref collected on the focal plane of the imaging lens 9a is incident on the objective lens 9b while diverging. In the reference unit 9, the focal position of the imaging lens 9a is coincident with the focal position of the objective lens 9b. Thus, both of the reference light Lref incident on the objective lens 9b from the focal point Pn1 and the reference light Lref incident on the objective lens 9b from the focal point Pn1' are collimated and emerged from the objective lens 9b. The reference light Lref emerged from the objective lens 9b is directed toward the objective lens 9c.

In the first state, the focal point Pn1 is positioned on the optical axis AXr. Furthermore, from the objective lens 9b to the objective lens 9c, the central ray of the reference light Lref is parallel to the optical axis AXr and overlaps the optical axis AXr.

In comparison, in the second state, the focal point Pn1' is not positioned on the optical axis AXr but positioned at a distance from the optical axis AXr. Furthermore, from the objective lens 9b to the objective lens 9c, the central ray of the reference light Lref is inclined relative to the optical axis AXr and intersects the optical axis AXr.

When a shift length of the focal point from the optical axis AXr is Δn, Δn=0 mm in the first state. In comparison, in the second state, Δn≠0 mm. When the angle formed by the parallel light beam emitted from the objective lens 9b and the optical axis AXr is θn, θn=0° in the first state. In comparison, in the second state, θn≠0°.

With change from the first state to the second state or change from the second state to the first state, the value of Δn changes. When the value of Δn changes, the value of θn changes. Furthermore, as the value of Δn increases, the value of θn also increases.

The change in θn occurs due to the change in Δn. The change in Δn is change in shift length of the focal point from the optical axis AXr. The focal point Pn1 and the focal point Pn1' are points at which the parallel light beam transmitted through the optical surface 3a is collected.

As described above, in the optical surface 3a, the incident position of light emitted from the illumination device 2 changes in the first state and the second state. Thus, the change in θn, that is, the change in angle formed by the parallel light beam emerged from the objective lens 9b and the optical axis AXr is caused by change in incident position of the parallel light beam in the optical surface 3a.

As just described, in the data acquisition apparatus 1, the angle formed by light traveling through the reference optical path OPr and the optical axis AXr changes with change in incident position.

In the reference optical path OPr, nothing is disposed from the objective lens 9b to the objective lens 9c. Thus, the reference light Lref is incident as it is on the objective lens 9c. The reference light Lref is collected by the objective lens 9c. In the first state, the reference light Lref is collected at a focal point Pn2 on the optical axis AXr. On the other hand, in the second state, the reference light Lref is collected at a focal point Pn2' at a distance from the optical axis AXr.

The reference light Lref incident on the objective lens 9c is a parallel light beam. Thus, the reference light Lref is collected at the focal position of the objective lens 9c. The focal point Pn2 and the focal point Pn2' are positioned on the focal plane of the objective lens 9c.

The reference light Lref collected on the focal plane of the objective lens 9c is incident on the imaging lens 9d while diverging. In the reference unit 9, the focal position of the objective lens 9c is coincident with the focal position of the imaging lens 9d. Therefore, both of the reference light Lref incident on the imaging lens 9d from the focal point Pn2 and the reference light Lref incident on the imaging lens 9d from the focal point Pn2' are collimated and emerged from the imaging lens 9d.

The reference light Lref emerged from the imaging lens 9d is reflected by the mirror 10. The reference light Lref reflected by the mirror 10 is incident on the second beam splitter 5. In the second beam splitter 5, part of the reference light Lref is reflected by the optical film and the rest is transmitted through the optical film. The reference light Lref reflected by the second beam splitter 5 is incident on the photodetector 6.

The optical path from the second beam splitter 5 to the photodetector 6 (hereinafter referred to as "common optical path OPc2") is an optical path through which both of the measurement light Lme1' and the reference light Lref travel. In the common optical path OPc2, the measurement light Lme1' and the reference light Lref travel in the same direction. Furthermore, the measurement light Lme1' and the reference light Lref overlap each other.

The measurement light Lme1' and the reference light Lref are incident on the photodetector 6. The measurement light Lme1' and the reference light Lref form interference fringes. As a result, it is possible to detect interference fringes.

In the data acquisition apparatus 1, the deflected light is incident on the measurement optical path OPm and the reference optical path OPr. By doing so, it is not necessary to dispose a member for deflecting light on the measurement optical path OPm. Hence, it is possible to reduce the size of the measurement optical path OPm.

It is possible to acquire a scattering potential by analyzing the interference fringes. A refractive index is obtained from the scattering potential.

The acquisition of the scattering potential is described. A space in which a sample is disposed (hereinafter referred to as "real space") is a space in units of distance. The measurement light Lme1' is a physical quantity in real space. The measurement light Lme1' includes scattering light. Thus, the scattering light is also a physical quantity in real space.

The real space is transformed by a Fourier transform into a space in units of frequency (hereinafter referred to as "frequency space"). Interference fringes can be considered as representing information in frequency space. Interference fringes include information on physical quantity in real space, for example, information on scattering light. Scattering light in real space is represented by the scattering potential intersecting a spherical shell of the Ewald sphere in frequency space.

Figure 3A:
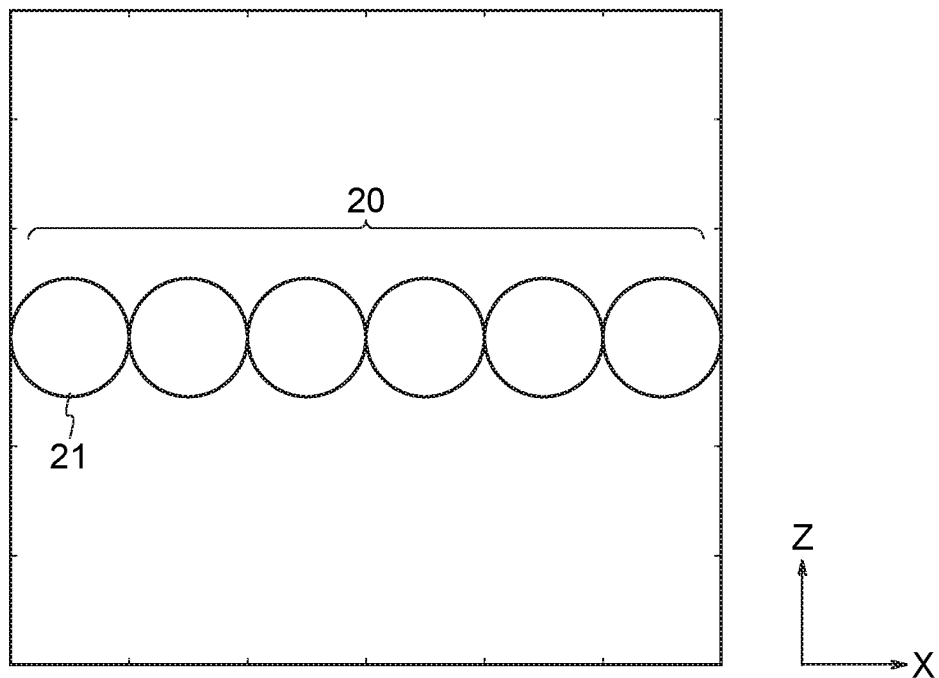
FIG. 3A and FIG. 3B are diagrams illustrating an example of a sample and an example of the scattering potential.
Figure 3B:
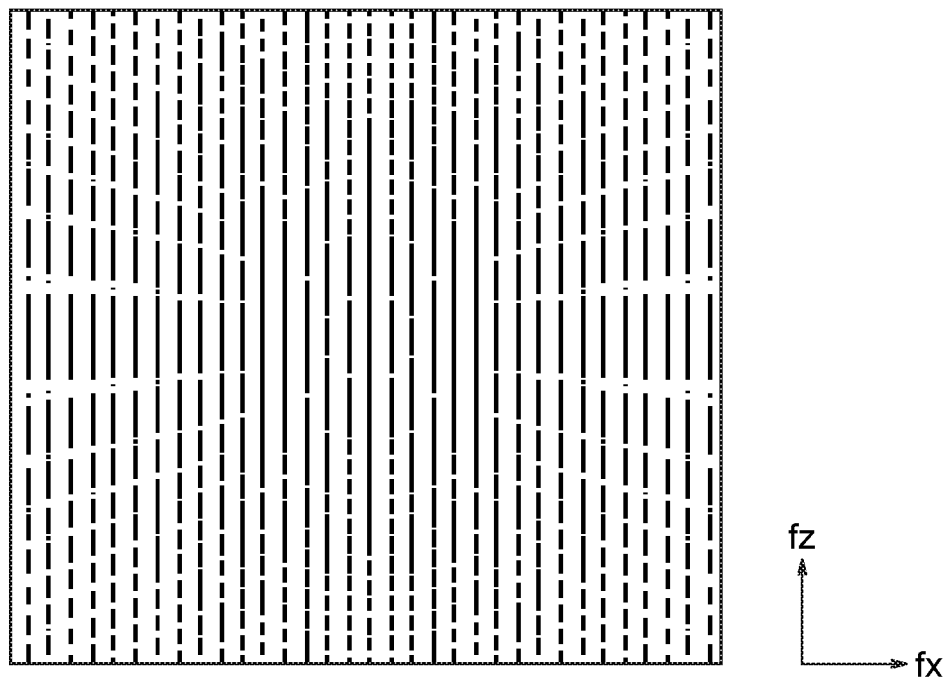

An example of the sample and an example of the scattering potential are illustrated in FIG. 3A and FIG. 3B. FIG. 3A is a diagram illustrating the sample, and FIG. 3B is a diagram illustrating the scattering potential.

A sample 20 has colorless transparent spheres 21. The diameter of the sphere 21 is, for example, 10 μm, and the refractive index of the sphere 21 is 1.364. The surrounding of the sphere 21 is filled with a colorless transparent liquid. The refractive index of the liquid is, for example, 1.334. Six spheres 21 are arranged in a row.

The scattering potential in real space is obtained from a refractive index distribution of the sample 20, using Expression (30) in U.S. Pat. No. 8,937,722. By performing Fourier transform for this scattering potential, a scattering potential in frequency space can be obtained. It is possible to represent all kinds of the physical information of the sample 20, for example, position, size, and refractive index by numerical values. Thus, the scattering potential can be obtained in a simulation. The scattering potential illustrated in FIG. 3B illustrates the result in a simulation.

An fx direction in frequency space corresponds to an x direction in real space. An fz direction in frequency space corresponds to a z direction in real space. As illustrated in FIG. 3B, the scattering potential in frequency space is distributed in the fx direction and the fz direction.

As described above, scattering light is produced in the sample 20. The direction in which scattering light is produced and the amplitude thereof depend on the irradiation angle of measurement light on the sample 20. Therefore, when the irradiation angle of measurement light is determined, only the scattering light having a specific amplitude for each direction is incident on the photodetector. That is, scattering light that can be detected is limited.

The scattering potential in frequency space corresponds to scattering light in real space. When scattering light that can be detected is limited, the scattering potential that can be acquired is also limited. In FIG. 3B, the scattering potential is distributed in the fx direction and the fz direction. However, the scattering potential that can be acquired is a part of this.

The scattering potential that can be acquired depends on the irradiation angle of measurement light. The irradiation angle of measurement light is represented by the direction connecting the center of the spherical shell of the Ewald sphere and the origin in frequency space.

The relation between the direction of measurement light and the position of a spherical shell of the Ewald sphere is illustrated in FIG. 4A and FIG. 4B. FIG. 4A is a diagram illustrating the direction of measurement light, and FIG. 4B is a diagram illustrating the position of a spherical shell of the Ewald sphere. FIG. 4B is an enlarged view of the central portion of FIG. 3B.

In FIG. 4A, the sample 20 is vertically irradiated with measurement light 22. In this case, the position of the spherical shell of the Ewald sphere is as depicted by a curve 23 as illustrated in FIG. 4B.

In FIG. 4B, the curve 23 corresponds to the irradiation angle of the measurement light 22. Thus, only the scattering potential at a portion intersecting the curve 23 is the scattering potential that can be actually acquired.

As illustrated in FIG. 3B, the scattering potential is distributed in the fx direction and the fz direction. However, as illustrated in FIG. 4B, the scattering potential that can be actually acquired is limited to the scattering potential at a portion intersecting the curve 23. If the number of scattering potentials that can be acquired is few, it is difficult to calculate the refractive index at a high accuracy.

In order to increase the number of scattering potentials that can be acquired, the curve 23 may be moved. By moving the curve 23, it is possible to acquire the scattering potential after moving the curve 23, in addition to the scattering potential before moving the curve 23. As a result, it is possible to increase the number of scattering potentials that can be acquired.

The position of the curve 23 changes according to the irradiation angle of measurement light. Thus, the curve 23 can be moved by changing the irradiation angle of measurement light.

The relation between the direction of measurement light and the position of a spherical shell of the Ewald sphere is illustrated in FIG. 5A and FIG. 5B. FIG. 5A is a diagram illustrating the directions of measurement light, and FIG. 5B is a diagram illustrating the positions of spherical shells of the Ewald sphere. A curve 23, a curve 25, and a curve 27 are curves each depicting the spherical shell of the Ewald sphere.

FIG. 5A illustrates a state in which the sample 20 is irradiated with measurement light from three directions. The measurement light 22 depicts measurement light irradiated vertically to the sample 20. In this case, the curve 23 intersects the scattering potential.

Measurement light 24 depicts light irradiated diagonally to the sample 20. In this case, the curve 25 intersects the scattering potential. Measurement light 26 depicts light irradiated diagonally to the sample 20. The measurement light 26 is irradiated at an angle larger than that of the measurement light 24. In this case, the curve 27 intersects the scattering potential.

When the irradiation angle of measurement light is changed from the angle of the measurement light 22 to the angle of the measurement light 26, the spherical shell of the Ewald sphere changes from the position of the curve 23 to the position of the curve 27. The scattering potential that can be acquired differs with positions. Thus, it is possible to widen the acquisition range of the scattering potential by widening the variable range of irradiation angles of measurement light.

The relation between the acquisition range of the scattering potential and the shape of the sample is illustrated in FIG. 6A, FIG. 6B, FIG. 6C, and FIG. 6D. FIG. 6A is a diagram illustrating a case where the acquisition range of the scattering potential is narrow, FIG. 6B is a diagram illustrating a case where the acquisition range of the scattering potential is wide, FIG. 6C is a diagram illustrating the shape of the sample in the case where the acquisition range is narrow, and FIG. 6D is a diagram illustrating the shape of the sample in the case where the acquisition range is wide.

Both of the shape of the sample illustrated in FIG. 6C and the shape of the sample illustrated in FIG. 6D are shapes obtained by calculation. The scattering potential is used in this calculation.

FIG. 6A illustrates a case where there is only one radiation direction of measurement light. In this case, there is only one curve that depicts the spherical shell of the Ewald sphere. FIG. 6B illustrates a case where there are a plurality of radiation directions of measurement light. In this case, there are a plurality of curves that depict the spherical shell of the Ewald sphere. Thus, when there are a plurality of curves, it is possible to obtain more scattering potentials than when there is only one curve.

As described above, both of the sample and the liquid are colorless transparent. However, the refractive index of the sample is different from the refractive index of the liquid. Thus, the clearer the difference in refractive index is, the clearer the boundary between the sample and the liquid, that is, the contour of the sample is.

Based on the comparison between FIG. 6C and FIG. 6D, it can be understood that the shape of the sample is clearer as the range in which the scattering potential can be acquired is wider. That is, it can be understood that as the number of scattering potentials that can be acquired is larger, it is possible to calculate the refractive index more accurately.

The contour of the sample in the x direction is clear at the same degree in FIG. 6C and FIG. 6D. However, the contour of the sample in the z direction is clearer in FIG. 6D in which there are more scattering potentials that can be acquired, than in FIG. 6C.

As described above, in the data acquisition apparatus 1, the irradiation angle of measurement light irradiated on the sample 11 can be changed. Therefore, it is possible to acquire more scattering potentials. In addition, in the data acquisition apparatus 1, it is possible to reduce the size of the measurement optical path OPm. As a result, it is possible to calculate the refractive index accurately even with a small apparatus.

In the data acquisition apparatus of the present embodiment, it is preferable that the measurement light and the reference light be incident on the photodetector, and an incident angle of the measurement light on the photodetector be different from an incident angle of the reference light on the photodetector.

In the data acquisition apparatus 1, the measurement light Lme1' and the reference light Lref travel in the same direction on the common optical path OPc2. Furthermore, the measurement light Lme1' and the reference light Lref overlap each other. However, the measurement light Lme1' and the reference light Lref may not necessarily travel in the same direction.

Figure 7A:
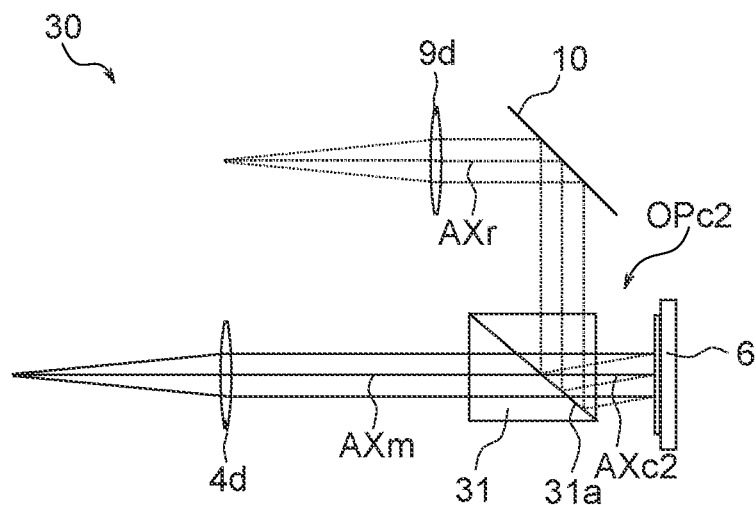
FIG. 7A, FIG. 7B, and FIG. 7C are diagrams illustrating modifications of the data acquisition apparatus.
Figure 7B:
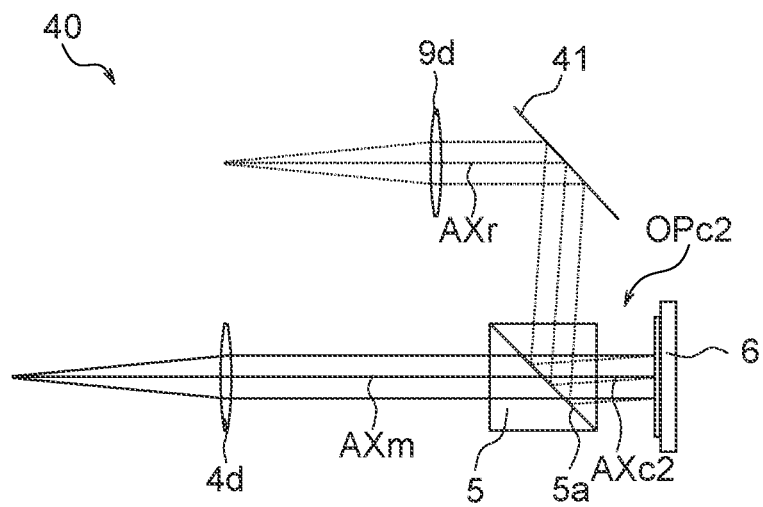
Figure 7C:
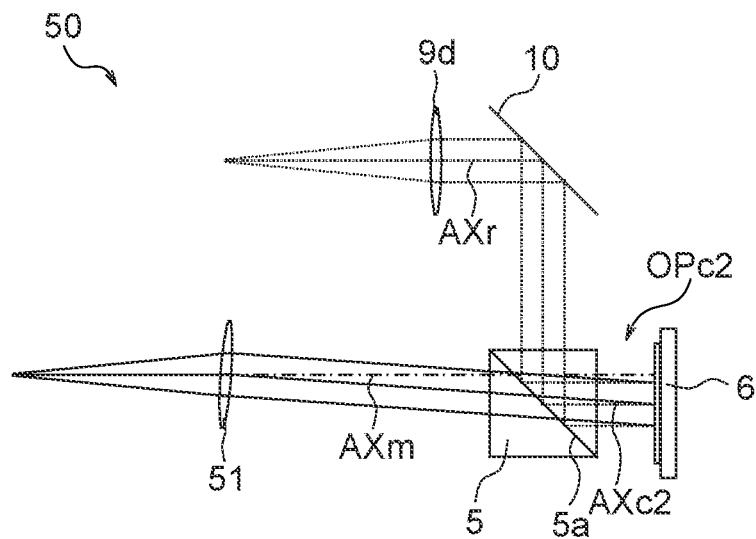

Modifications of the data acquisition apparatus are illustrated in FIG. 7A, FIG. 7B, and FIG. 7C. FIG. 7A is a diagram illustrating a data acquisition apparatus of a first modification, FIG. 7B is a diagram illustrating a data acquisition apparatus of a second modification, and FIG. 7C is a diagram illustrating a data acquisition apparatus of a third modification.

In FIG. 7A, FIG. 7B, and FIG. 7C, the configuration of only a part of the data acquisition apparatus is illustrated. The same constituent element as that in FIG. 2A is denoted by the same numeral and a description thereof is omitted. In each modification, the angle difference between measurement light and reference light may be, for example, 5° or smaller.

A data acquisition apparatus 30 of the first modification includes a second beam splitter 31. The second beam splitter 31 has an optical surface 31a.

The data acquisition apparatus 1 and the data acquisition apparatus 30 differ in the angle formed by the normal to the optical surface 5a and the optical axis AXm and the angle formed by the normal to the optical surface 31a and the optical axis AXm. In the data acquisition apparatus 1, the angle formed by the normal to the optical surface 5a and the optical axis AXm is 45°. In comparison, in the data acquisition apparatus 30, the angle formed by the normal to the optical surface 31a and the optical axis AXm is greater than 45°.

The traveling direction of the measurement light Lme1' in the common optical path OPc2 is the same in the data acquisition apparatus 30 and the data acquisition apparatus 1. On the other hand, the traveling direction of the reference light Lref differs between the data acquisition apparatus 30 and the data acquisition apparatus 1.

As described above, in the data acquisition apparatus 30, the angle formed by the normal to the optical surface 31a and the optical axis AXm is greater than 45°. Therefore, the reference light Lref incident on the second beam splitter 31 is reflected in a direction intersecting the measurement light Lme1'. The measurement light Lme1' is parallel to the optical axis of the common optical path OPc2 (hereinafter referred to as "optical axis AXc2"). On the other hand, the reference light Lref intersects the optical axis AXc2.

Therefore, interference fringes detected by the data acquisition apparatus 30 are different from interference fringes detected by the data acquisition apparatus 1. However, by using an appropriate method of analyzing interference fringes, for example, Fourier fringe analysis, in calculating the refractive index, it is possible to calculate the refractive index at a high accuracy even when the interference fringes detected by the data acquisition apparatus 30 are used.

A data acquisition apparatus 40 of the second modification includes a mirror 41. The data acquisition apparatus 1 and the data acquisition apparatus 40 differ in the angle formed by the normal to the reflecting surface of the mirror 10 and the optical axis AXr and the angle formed by the normal to the reflecting surface of the mirror 41 and the optical axis AXr. In the data acquisition apparatus 1, the angle formed by the normal to the reflecting surface of the mirror 10 and the optical axis AXr is 45°. In comparison, in the data acquisition apparatus 40, the angle formed by the normal to the reflecting surface of the mirror 41 and the optical axis AXr is smaller than 45°.

The traveling direction of the measurement light Lme1' in the common optical path OPc2 is the same in the data acquisition apparatus 40 and the data acquisition apparatus 1. On the other hand, the traveling direction of the reference light Lref differs between the data acquisition apparatus 40 and the data acquisition apparatus 1.

As described above, in the data acquisition apparatus 40, the angle formed by the normal to the reflecting surface of the mirror 10 and the optical axis AXm is smaller than 45°. Therefore, the reference light Lref incident on the second beam splitter 5 is reflected in a direction intersecting the measurement light Lme1'. The measurement light Lme1' is parallel to the optical axis AXc2. On the other hand, the reference light Lref intersects the optical axis AXc2.

Therefore, interference fringes detected by the data acquisition apparatus 40 are different from interference fringes detected by the data acquisition apparatus 1. However, by using an appropriate method of analyzing interference fringes, for example, Fourier fringe analysis, in calculating the refractive index, it is possible to calculate the refractive index at a high accuracy even when the interference fringes detected by the data acquisition apparatus 40 are used.

A data acquisition apparatus 50 of the third modification includes an imaging lens 51. The data acquisition apparatus 1 and the data acquisition apparatus 50 differ in the angle formed by the center axis of the imaging lens 4d and the optical axis AXr and the angle formed by the center axis of the imaging lens 51 and the optical axis AXr. In the data acquisition apparatus 1, the angle formed by the center axis of the imaging lens 4d and the optical axis AXr is 0°. In comparison, in the data acquisition apparatus 50, the angle formed by the center axis of the imaging lens 51 and the optical axis AXr is not 0°.

The traveling direction of the measurement light Lme1' in the common optical path OPc2 differs between the data acquisition apparatus 50 and the data acquisition apparatus 1. On the other hand, the traveling direction of the reference light Lref is the same in the data acquisition apparatus 40 and the data acquisition apparatus 1.

As described above, in the data acquisition apparatus 50, the angle formed by the center axis of the imaging lens 51 and the optical axis AXm is not 0°. Therefore, the measurement light Lme1' incident on the second beam splitter 5 travels in a direction intersecting the reference light Lref. The measurement light Lme1' intersects the optical axis AXc2. On the other hand, the reference light Lref is parallel to the optical axis AXc2.

Therefore, interference fringes detected by the data acquisition apparatus 50 are different from interference fringes detected by the data acquisition apparatus 1. However, by using an appropriate method of analyzing interference fringes, for example, Fourier fringe analysis, in calculating the refractive index, it is possible to calculate the refractive index at a high accuracy even when the interference fringes detected by the data acquisition apparatus 50 are used.

In the data acquisition apparatus of the present embodiment, it is preferable that the illumination device include a light-emitting portion, the measurement unit include an objective lens, and the light-emitting portion be disposed at a position conjugate to a pupil position of the objective lens.

As described above, in the data acquisition apparatus 1, light emitted from the light-emitting portion of the illumination device 2 is positioned on the focal plane of the imaging lens 4a. The focal position of the imaging lens 4a is coincident with the focal position of the objective lens 4b. Thus, light emitted from the light-emitting portion of the illumination device 2 is collected at the focal position of the objective lens 4b.

In this way, in the data acquisition apparatus 1, the light-emitting portion is disposed at a position conjugate to the pupil position of the objective lens. As a result, the angle formed by light traveling through the measurement optical path OPm and the optical axis AXm can be changed.

In the data acquisition apparatus of the present embodiment, it is preferable that the illumination device include a plurality of light-emitting portions arranged in an array, and in the light-emitting portions, emission of light can be controlled independently.

Figure 8A:
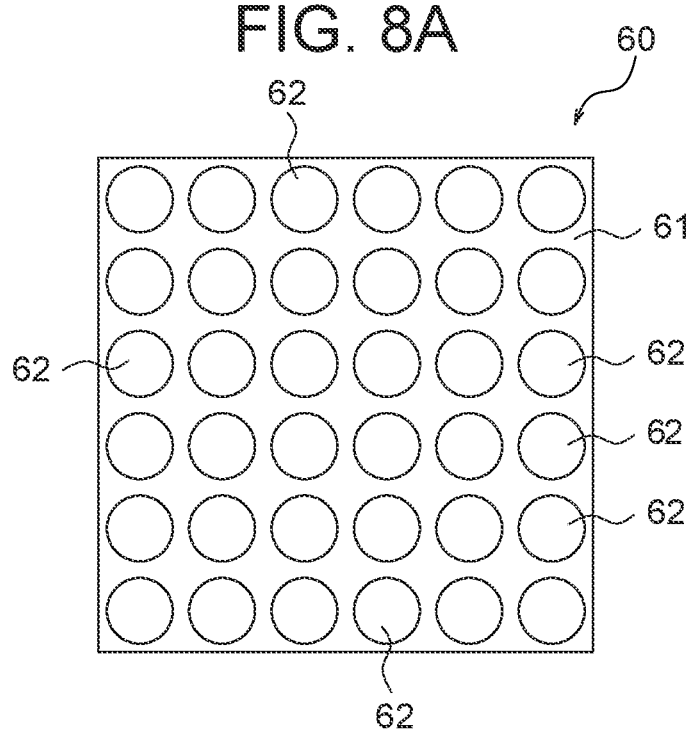
FIG. 8A, FIG. 8B, and FIG. 8C are diagrams illustrating specific examples of an illumination device.
Figure 8B:
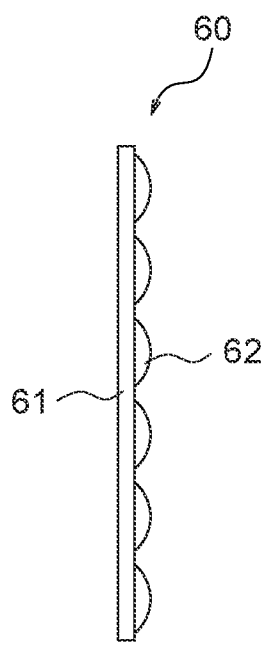
Figure 8C:
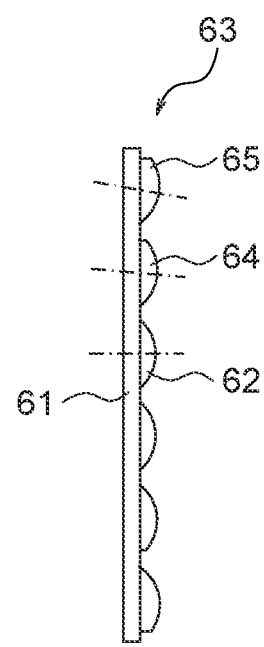

Specific examples of the illumination device are illustrated in FIG. 8A, FIG. 8B, and FIG. 8C. FIG. 8A is a front view of an illumination device of a first specific example. FIG. 8B is a side view of the illumination device of the first specific example. FIG. 8C is a side view of an illumination device of a second specific example.

The first specific example of the illumination device is described. An illumination device 60 of the first specific example includes a substrate 61 and a plurality of light-emitting diodes 62. The number of light-emitting diodes is not limited.

Light is emitted from the light-emitting diodes 62. In the illumination device 60, the light-emitting diodes 62 correspond to the light-emitting portion. The light-emitting diodes 62 are arranged in an array. Thus, in the illumination device 60, the light-emitting portions are arranged in an array.

In the illumination device 60, as illustrated in FIG. 8B, the emission direction of light is the same in all of the light light-emitting diodes 62. Therefore, in the illumination device 60, it is necessary to dispose the lens 7 between the illumination device 60 and the first beam splitter 3.

The second specific example of the illumination device is described. An illumination device 63 of the second specific example includes the substrate 61 and a plurality of light-emitting diodes. The light-emitting diodes include the light-emitting diode 62, the light-emitting diode 64, and a light-emitting diode 65. The number of light-emitting diodes is not limited.

In the illumination device 63, the light-emitting diode 64 is positioned on the outside of the light-emitting diode 62, and a light-emitting diode 65 is positioned on the outside of the light-emitting diode 64. Then, the orientation of the light-emitting diode 62, the orientation of the light-emitting diode 64, and the orientation of the light-emitting diode 65 intersect at any given one point. That is, the light-emitting diode 62, the light-emitting diode 64, and the light-emitting diode 65 are disposed on the circumference of the same circle.

Therefore, in the illumination device 63, it is unnecessary to dispose the lens 7 between the illumination device 63 and the first beam splitter 3. However, the illumination device 63 is disposed at a position as far as possible from the first beam splitter 3.

Furthermore, the orientation of the light-emitting diode 62 is different from the orientation of the light-emitting diode 64. The orientation of the light-emitting diode 64 is different from the orientation of the light-emitting diode 65. In this way, it is possible to suppress loss of light by directing the orientation of the light-emitting diodes positioned on the outside toward the center.

In each of the light-emitting diodes, it is possible to independently control emission of light. Thus, it is possible to independently control emission of light in the light-emitting portions.

Laser diodes (LDs) may be used instead of light-emitting diodes (LEDs) for the light-emitting portion.

The light-emitting portion may be disposed on a Fourier plane. By disposing the illumination device 60 at a sufficient distance from the first beam splitter 3, it is possible to dispose the light-emitting portion on the Fourier plane.

Figure 9:
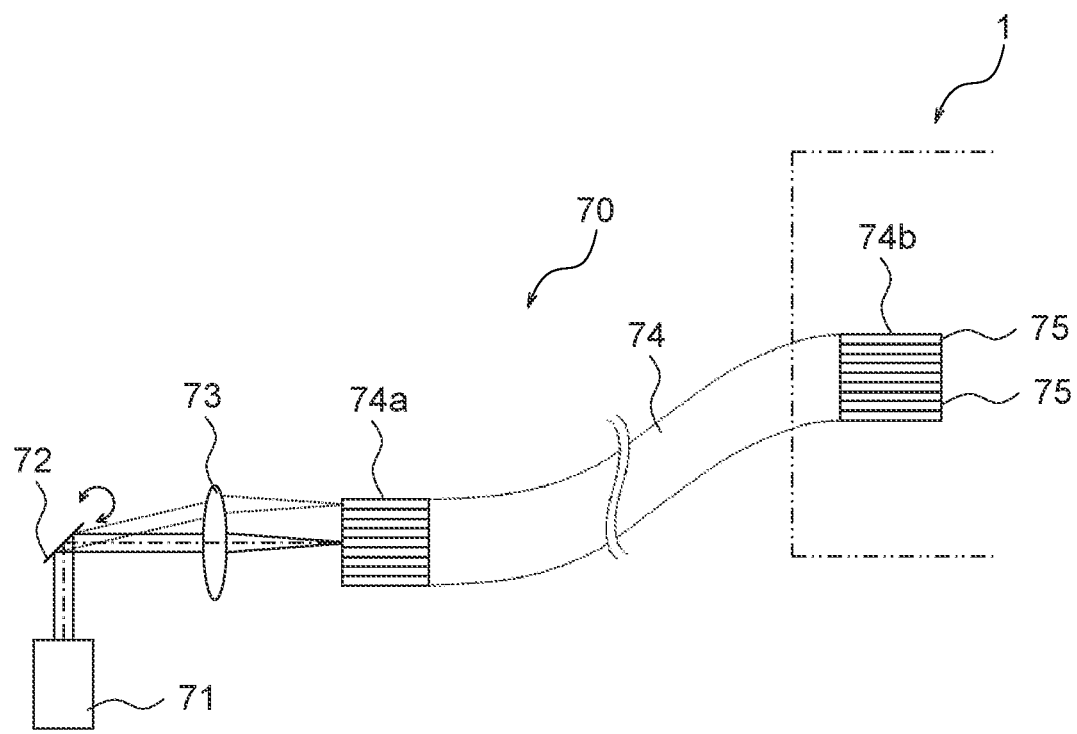
FIG. 9 is a diagram illustrating another specific example of an illumination device.

Another specific example of an illumination device is illustrated in FIG. 9. An illumination device 70 of a third specific example includes a light source 71, an optical deflector 72, a lens 73, and an optical fiber bundle 74. The optical fiber bundle 74 includes a plurality of optical fibers.

Light is emerged from output facets 75 of the optical fibers. In the illumination device 70, the output facets 75 of the optical fibers correspond to the light-emitting portion. The optical fibers are arranged in an array. Thus, in the illumination device 70, the light-emitting portions are arranged in an array.

Light emitted from the light source 71 is incident on the optical deflector 72. The optical deflector 72 is disposed at the focal position of the lens 73. At the optical deflector 72, incident light is reflected toward the lens 73.

The light reflected by the optical deflector 72 is incident on the lens 73. The light incident on the lens 73 is collected by the lens 73. An end surface of an input end 74a is positioned at the light-collected position.

The optical fiber bundle 74 includes the optical fibers. Thus, the collected light is incident on any one of the optical fibers. In the optical fiber on which light is incident, light is transmitted toward the exit end surface 75. Light reaching the exit end surface 75 is emerged from the exit end surface 75.

In the illumination device 70, incident light is deflected by the optical deflector 72. Therefore, the collected light moves on the end surface of the input end 74a. The collected light moves, whereby the optical fibers on which light is incident change. As a result, the position of light emerged from an exit end 74b changes.

The optical fiber on which light is incident can be selected by the optical deflector 72. Thus, it is possible to independently control emission of light in the light-emitting portions.

In the illumination device 70, it is possible to dispose only the exit end 74b in the data acquisition apparatus 1. Therefore, it is possible to reduce the size of the data acquisition apparatus 1.

The number of optical deflectors is not limited to one. For example, a galvanometer scanner may be used as the optical deflector.

In the data acquisition apparatus of the present embodiment, it is preferable that the illumination device include the light-emitting diodes arranged in an array, a wavelength selection member be disposed between the illumination device and the first beam splitter, and the wavelength selection member have an optical characteristic of transmitting light in a certain wavelength range.

Modifications to the data acquisition apparatus are illustrated in FIG. 10A and FIG. 10B. FIG. 10A is a diagram illustrating a data acquisition apparatus of a fourth modification, and FIG. 10B is a diagram illustrating a data acquisition apparatus of a fifth modification.

As illustrated in FIG. 10A, a data acquisition apparatus 80 of the fourth modification includes an illumination device 81 and a wavelength selection member 82. The wavelength selection member 82 is disposed between the lens 7 and the first beam splitter 3. However, the arrangement position of the wavelength selection member 82 is not limited to between the lens 7 and the first beam splitter 3. It is only necessary that the wavelength selection member 82 is disposed between the illumination device 81 and the first beam splitter 3.

In the illumination device 81, a monochrome light-emitting diode is used for the light-emitting portion. Furthermore, a band-pass filter is used for the wavelength selection member 82. It is assumed that the wavelength width of the monochrome light-emitting diode is wider than the wavelength width of monochrome light and narrower than the wavelength width of white light.

If the coherence length of the measurement light Lme1 and the coherence length of the reference light Lref are long, it is possible to increase the coherence length. If the coherence length is long, it is possible to form interference fringes even when the optical path length difference between the measurement optical path OPm and the reference optical path OPr is large.

The measurement light Lme1 and the reference light Lref are light emitted from the light-emitting portion. Thus, it is desirable that the coherence length of light emitted from the light-emitting portion be long. The narrower the wavelength width of light is, the longer the coherence length is. Thus, a narrower wavelength width of light emitted from the light-emitting portion is preferred. For example, since the wavelength width of monochrome light is extremely narrow, the coherence length of monochrome light is long.

The wavelength width of light emitted from the light-emitting diode is not as narrow as that of monochrome light. Therefore, when the light-emitting portion is a light-emitting diode, a coherence length as long as that of monochrome light can not obtained. Thus, it is desirable to dispose the wavelength selection member 82 between the illumination device 81 and the first beam splitter 3.

The wavelength selection member 82 is, for example, a band-pass filter. In a transmission-type band-pass filter, the wavelength width of transmitted light is extremely narrow. In a reflection-type band-pass filter, the wavelength width of reflected light is narrow. Therefore, the wavelength width of light emerged from the band-pass filter is narrower than the wavelength width of light emitted from the light-emitting diode.

It is possible to obtain a coherence length CL by the following expression:

$$CL = \lambda^2 / \Delta\lambda$$

where $\lambda$ is a center wavelength, and $\Delta\lambda$ is a wavelength width.

When the wavelength selection member 82 is not disposed on the common optical path OPc1, the coherence length is as follows. Here, light emitted from the light-emitting diode has, for example, the following center wavelength $\lambda 1$ and wavelength width $\Delta\lambda 1$. In this case, the coherence length CL1 of light emitted from the light-emitting diode is 21 μm.

$$\lambda 1 = 663 \text{ nm}, \Delta\lambda 1 = 21 \text{ nm}.$$

$$CL1 = (663 \times 10^{-9})^2 / (21 \times 10^{-9}) = 21 \times 10^{-6}$$

When the wavelength selection member 82 is disposed on the common optical path OPc1, the coherence length is as follows. Here, the wavelength selection member 82 has, for example, the following center wavelength $\lambda 1$ and wavelength width $\Delta\lambda 2$. In this case, a coherence length CL2 of light emerged from the wavelength selection member 82 is 220 μm.

$$\lambda 1 = 663 \text{ nm}, \Delta\lambda 2 = 2 \text{ nm}.$$

$$CL2 = (663 \times 10^{-9})^2 / (2 \times 10^{-9}) = 220 \times 10^{-6}$$

In this way, by disposing the wavelength selection member 82 on the common optical path OPc1, it is possible to increase the coherence length. Therefore, it is possible to form interference fringes even when the optical path length difference between the measurement optical path OPm and the reference optical path OPr is large in a state in which the sample 11 is not disposed.

Furthermore, even when there is no optical path length difference between the measurement optical path OPm and the reference optical path OPr in a state in which the sample 11 is not disposed, the optical path length difference between the measurement optical path OPm and the reference optical path OPr is caused by disposing the sample 11. Even in this case, it is possible to form interference fringes. Further, even when the sample 11 is thick, it is possible to form interference fringes.

In the data acquisition apparatus 80, the wavelength width of the measurement light Lme1 and the wavelength width of the reference light Lref are determined by the wavelength width of light emerged from the wavelength selection member 82. Therefore, the wavelength width of light emitted from the light-emitting portion may be wide. For example, a white light-emitting diode may be used for the light-emitting portion.

As illustrated in FIG. 10B, a data acquisition apparatus 90 of the fifth modification includes an illumination device 91 and a wavelength selection member 92. The same constituent element as that in FIG. 10A is denoted by the same numeral and a description thereof is omitted.

The wavelength selection member 92 is disposed between the lens 7 and the first beam splitter 3. However, the arrangement position of the wavelength selection member 92 is not limited to between the lens 7 and the first beam splitter 3. It is only necessary that the wavelength selection member 92 is disposed between the illumination device 91 and the first beam splitter 3.

In the illumination device 91, a white light-emitting diode is used for the light-emitting portion. Furthermore, a band-pass filter is used for the wavelength selection member 92. The wavelength width of the white light-emitting diode is wider than the wavelength width of monochrome light or the wavelength of a monochrome light-emitting diode.

In the data acquisition apparatus 90, the wavelength selection member 82 and the wavelength selection member 92 are used. The center wavelength of the wavelength selection member 82 is different from the center wavelength of the wavelength selection member 92. However, the wavelength width of the wavelength selection member 82 may be the same as or may be different from the wavelength width of the wavelength selection member 92.

In the data acquisition apparatus 90, for example, first, the wavelength selection member 82 is positioned on the common optical path OPc1, and interference fringes are detected. Subsequently, the wavelength selection member 82 is removed from the common optical path OPc1, and the wavelength selection member 92 is positioned on the common optical path OPc1. Interference fringes are then detected. By doing so, it is possible to detect interference fringes at different wavelengths. As described above, the refractive index of the sample can be obtained from the interference fringes. Thus, it is possible to obtain the refractive index for each wavelength. The number of wavelength selection members is not limited to two.

In the data acquisition apparatus of the present embodiment, it is preferable that the following Expression (1) be satisfied:

$$n-m=2x \quad (1)$$

where n is the number of predetermined positions in the reference optical path, m is the number of predetermined positions in the measurement optical path, the predetermined position is a position conjugate to the illumination device, and x is an integer.

In the data acquisition apparatus 1, the focal point Pm1, the focal point Pm1', the focal point Pn1, and the focal point Pn1' are formed. The four focal points are points at which the emitted light Lout is collected. The emitted light Lout is emitted from the illumination device 2. Thus, each of the four focal points indicates a position conjugate to the illumination device 2, that is, the predetermined position.

The emitted light Lout is emitted from the light-emitting portion of the illumination device 2. More specifically, each of the four focal points indicates a position conjugate to the light-emitting portion. Thus, it is possible to say that the predetermined position is a position conjugate to the light-emitting portion.

The focal point Pm1 and the focal point Pm1' are formed on the measurement optical path OPm. Thus, m=2. The focal point Pn1 and the focal point Pn1' are formed on the reference optical path OPr. Thus, n=2. In this case, n−m=0. Thus, in the data acquisition apparatus 1, Expression (1) is satisfied.

Here, attention is paid to an area from the imaging lens 4d to the second beam splitter 5 and an area from the imaging lens 9d to the mirror 10. In the area from the imaging lens 4d to the second beam splitter 5, a state of the measurement light Lme1' is illustrated. On the other hand, in the area from the imaging lens 9d to the mirror 10, a state of the reference light Lref is illustrated.

As can be understood from FIG. 2A and FIG. 2B, in both of the first state and the second state, the direction in which the measurement light Lme1' travels and the direction in which the reference light Lref travels are the same.

In the first state and the second state, the incident position of the emitted light Lout changes with time in the optical surface 3a of the first beam splitter 3. However, when Expression (1) is satisfied, it is possible to allow the measurement light Lme1' and the reference light Lref to be incident on the second beam splitter 5 in the same direction even though the incident position of the emitted light Lout changes in the optical surface 3a.

The change in incident position of the emitted light Lout in the optical surface 3a is caused by change in emission position of the emitted light Lout in the illumination device 2. The emitted light Lout is emitted from the light-emitting portion of the illumination device 2. Thus, when Expression (1) is satisfied, it is possible to allow the measurement light Lme1' and the reference light Lref to be incident on the second beam splitter 5 in the same direction, irrespective of the position of the light-emitting portion. As a result, it is possible to keep the interval between interference fringes constant, irrespective of the position of the light-emitting portion.

In the data acquisition apparatus of the present embodiment, it is preferable that light traveling in the first direction be measurement light, light traveling in the second direction be reference light, and the beam diameter of measurement light incident on the second beam splitter and the beam diameter of reference light incident on the second beam splitter be equal.

It is preferable that the data acquisition apparatus of the present embodiment further include a reference unit, each of the measurement unit and the reference unit include an afocal optical system, and the magnifications of two afocal optical systems be equal.

In the data acquisition apparatus 1, the same optical system as the optical system of the measurement unit 4 is used for the optical system of the reference unit 9. In this case, the beam diameter of light incident on the second beam splitter 5 is equal between the measurement light Lme1' and the reference light Lref.

Furthermore, it is possible to use an afocal optical system for the optical system of the measurement unit and the optical system of the reference unit. In this case, the magnification of the afocal optical system of the measurement unit 4 and the magnification of the afocal optical system of the reference unit 9 are made equal. As a result, the beam diameter of light incident on the second beam splitter 5 is equal between the measurement light Lme1' and the reference light Lref.

As a result, it is possible to make the angle formed by the measurement light Lme1' and the optical axis AXm equal to the angle formed by the reference light Lref and the optical axis AXr in the first state and the second state.

Furthermore, by satisfying Expression (1), it is possible to equalize not only the angle formed by the optical axis but also the orientation relative to the second beam splitter 5 between the measurement light Lme1' and the reference light Lref, in both of the first state and the second state, even when the incident position of the emitted light Lout changes in the optical surface 3a.

The change in incident position of the emitted light Lout in the optical surface 3a is caused by change in emission position of the emitted light Lout in the illumination device 2. The emitted light Lout is emitted from the light-emitting portion of the illumination device 2. Thus, it is possible to equalize not only the angle formed by the optical axis but also the orientation relative to the second beam splitter 5 between the measurement light Lme1' and the reference light Lref, irrespective of the position of the light-emitting portion.

Interference fringes are formed by the measurement light Lme1' and the reference light Lref. By setting as described above, it is possible to make the widths of interference fringes constant, irrespective of the position of the light-emitting portion.

It is preferable that the data acquisition apparatus of the present embodiment further include a third beam splitter and another measurement unit, the third beam splitter be disposed in the first direction, another measurement optical path be positioned between the third beam splitter and the photodetector, the third beam splitter have an optical surface in which an optical film is formed, in the third beam splitter, light traveling in the first direction and light traveling in a third direction be generated from incident light by the optical film, the other measurement optical path is positioned in the third direction, the other measurement unit be disposed in the other measurement optical path, and the measurement optical path and the other measurement optical path intersect with each other.

Figure 11:
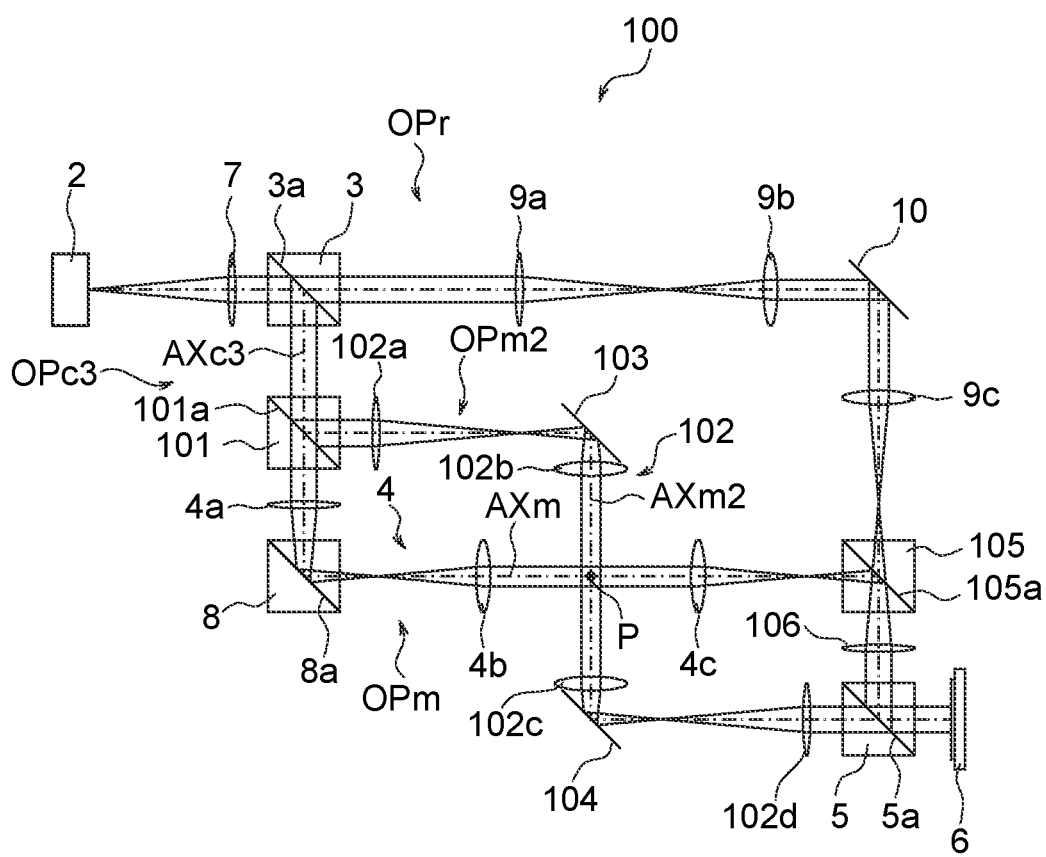
FIG. 11 is a diagram illustrating another data acquisition apparatus of the present embodiment.

Another data acquisition apparatus of the present embodiment is illustrated in FIG. 11. The same constituent element as that in FIG. 2A is denoted by the same numeral and a description thereof is omitted.

A data acquisition apparatus 100 includes a third beam splitter 101 and another measurement unit 102. The third beam splitter 101 is disposed in the first direction. Another measurement optical path is positioned between the third beam splitter and the photodetector.

The third beam splitter 101 has an optical surface 101a in which an optical film is formed. In the third beam splitter 101, light traveling in the first direction and light traveling in the third direction are generated from incident light.

An optical path is positioned in each of the first direction and the third direction. The optical path positioned in the first direction is a measurement optical path OPm. The optical path positioned in the third direction is another optical path for measurement (hereinafter referred to as "measurement optical path OPm2"). In the data acquisition apparatus 100, the measurement optical path OPm and the measurement optical path OPm2 are positioned between the third beam splitter 101 and the photodetector 6.

In the third beam splitter 101, reflected light and transmitted light are generated by the optical film. In the data acquisition apparatus 100, the transmitted light corresponds to the light traveling in the first direction, and the reflected light corresponds to the light traveling in the third direction.

In the data acquisition apparatus 100, the measurement optical path OPm and the measurement optical path OPm2 are formed by the third beam splitter 101, from the optical path from the first beam splitter 3 to the third beam splitter 101 (hereinafter referred to as "common optical path OPc3"). An optical axis AXc3 is the optical axis of the common optical path OPc3.

The first direction and the third direction intersect with each other. In the data acquisition apparatus 100, the angle formed by the normal to the optical surface 101a and the optical axis AXc3 is 45°. Thus, the first direction and the third direction are orthogonal to each other.

The measurement optical path OPm is positioned in the first direction. Thus, the measurement optical path OPm is positioned on the transmission side of the third beam splitter 101. The measurement optical path OPm2 is positioned in the third direction. Thus, the measurement optical path OPm2 is positioned on the reflection side of the third beam splitter 101.

In the foregoing description, the transmitted light generated by the optical surface 101a corresponds to the light traveling in the first direction. Furthermore, the reflected light generated by the optical surface 101a corresponds to the light traveling in the third direction. Thus, the measurement optical path OPm is positioned on the transmission side of the third beam splitter 101, and the measurement optical path OPm2 is positioned on the reflection side of the third beam splitter 101.

However, the transmitted light generated by the optical surface 101a may correspond to the light traveling in the third direction. Furthermore, the reflected light generated by the optical surface 101a may correspond to the light traveling in the first direction. In this case, the measurement optical path OPm2 is positioned on the transmission side of the third beam splitter 101, and the measurement optical path OPm is positioned on the reflection side of the third beam splitter 101.

The other measurement unit 102 is disposed on the measurement optical path OPm2. The light traveling in the third direction is incident on the other measurement unit 102 and thereafter emerged from the other measurement unit 102. The light emerged from the other measurement unit 102 is incident on the second beam splitter 5.

The data acquisition apparatus 100 is described in more detail. In the data acquisition apparatus 100, a mirror 103, a mirror 104, a fourth beam splitter 105, and a lens 106 are disposed.

A parallel light beam reflected by the optical surface 101a is a parallel light beam traveling in the third direction. The parallel light beam traveling in the third direction is another light for measurement (hereinafter referred to as "measurement light Lme2").

The measurement light Lme2 is described. The measurement light Lme2 is incident on the measurement unit 102. In the measurement unit 102, an imaging lens 102a, an objective lens 102b, an objective lens 102c, and an imaging lens 102d are disposed along the optical axis of the measurement optical path OPm2 (hereinafter referred to as "optical axis AXm2").

An illumination optical system is formed by the imaging lens 102a and the objective lens 102b. A detection optical system is formed by the objective lens 102c and the imaging lens 102d. In the measurement unit 102, the illumination optical system and the detection optical system face each other with a point P interposed therebetween.

In the data acquisition apparatus 100, the same optical system as the optical system of the measurement unit 4 is used for the optical system of the other measurement unit 102. Thus, a detailed description is omitted.

The measurement light Lme2 is incident on the imaging lens 102a and collected by the imaging lens 102a. The measurement light Lme2 incident on the imaging lens 102a is a parallel light beam. Thus, the measurement light Lme2 is collected at the focal position of the imaging lens 102a.

The measurement light Lme2 collected on the focal plane of the imaging lens 102a is incident on the mirror 103 while diverging. The measurement light Lme2 incident on the mirror 103 is reflected by the mirror 103. The measurement light Lme2 reflected by the mirror 103 is incident on the objective lens 102b.

In the measurement unit 102, the focal position of the imaging lens 102a is coincident with the focal position of the objective lens 102b. Thus, the measurement light Lme2 incident on the objective lens 102b is collimated and emerged from the objective lens 102b. The measurement light Lme2 emerged from the objective lens 102b is directed toward the objective lens 102c.

As described above, in the optical surface 3a, the incident position of light emitted from the illumination device 2 changes in the first state and the second state. Thus, change in angle formed by the parallel light beam emerged from the objective lens 102b and the optical axis AXm2 is caused by change in incident position of the parallel light beam in the optical surface 3a.

As just described, in the data acquisition apparatus 100, the angle formed by light traveling through the measurement optical path OPm2 and the optical axis AXm2 changes with change in incident position.

It is possible to dispose the sample 11 at the point P. In the data acquisition apparatus 100, the irradiation angle of measurement light irradiated on the sample 11 can be changed.

When the sample 11 is a living cell, since the living cell is colorless transparent, the measurement light Lme2 is transmitted through the sample 11. At this moment, the measurement light Lme2 is affected by the sample 11. As a result, scattering light is emerged from the sample 11.

Measurement light including scattering light (hereinafter referred to as "measurement light Lme2'") is incident on the objective lens 102c. The measurement light Lme2' emerged from the objective lens 102c is reflected by the mirror 104. The measurement light Lme2' incident on the objective lens 102c is a parallel light beam. Thus, the measurement light Lme2' is collected at the focal position of the objective lens 102c.

The measurement light Lme2' collected on the focal plane of the objective lens 102c is incident on the imaging lens 102d while diverging. In the measurement unit 102, the focal position of the objective lens 102c is coincident with the focal position of the imaging lens 102d. Thus, the measurement light Lme2' incident on the imaging lens 102d is collimated and emerged from the imaging lens 102d.

The measurement light Lme2' emerged from the imaging lens 102d is incident on the second beam splitter 5. In the second beam splitter 5, part of the measurement light Lme2' is reflected by the optical film and the rest is transmitted through the optical film. The measurement light Lme2' transmitted through the second beam splitter 5 is incident on the photodetector 6.

The measurement optical path OPm and the reference optical path OPr are described. In the data acquisition apparatus 100, the third beam splitter 101 is disposed between the first beam splitter 3 and the mirror 8. Therefore, the data acquisition apparatus 1 and the data acquisition apparatus 100 differ in position of the mirror 8 and the mirror 10.

In the data acquisition apparatus 1, the mirror 8 is disposed between the first beam splitter 3 and the imaging lens 4a. In comparison, in the data acquisition apparatus 100, the mirror 8 is disposed between the imaging lens 4a and the objective lens 4b.

In the data acquisition apparatus 1, the mirror 10 is disposed between the imaging lens 9d and the second beam splitter 5. In comparison, in the data acquisition apparatus 100, the mirror 10 is disposed between the objective lens 9b and the objective lens 9c.

Further, in the data acquisition apparatus 100, the fourth beam splitter 105 is disposed at the position where the measurement optical path OPm and the reference optical path OPr intersect with each other. Furthermore, the lens 106 is disposed between the fourth beam splitter 105 and the second beam splitter 5.

The fourth beam splitter 105 has an optical surface 105a in which an optical film is formed. The angle formed by the normal to the optical surface 105a and the optical axis AXm is 45°.

In the fourth beam splitter 105, two light beams are generated from incident light by the optical film. One of the two light beams is incident on the second beam splitter 5.

Both of the measurement light Lme1' emerged from the objective lens 4c and the reference light Lref' emerged from the objective lens 9c are incident on the fourth beam splitter 105.

In the fourth beam splitter 105, part of the measurement light Lme1' is reflected by the optical film and the rest is transmitted through the optical film. The measurement light Lme1' reflected by the fourth beam splitter 105 is incident on the lens 106.

Furthermore, in the fourth beam splitter 105, part of the reference light Lref is reflected by the optical film and the rest is transmitted through the optical film. The reference light Lref transmitted through the fourth beam splitter 105 is incident on the lens 106.

The lens 106 corresponds to the imaging lens 4d of the measurement unit 4 and the imaging lens 9d of the reference unit 9 in the data acquisition apparatus 1. In the lens 106, the divergent light is converted into a parallel light beam.

The measurement light Lme1' and the reference light Lref emerged from the lens 106 are incident on the second beam splitter 5. In the second beam splitter 5, part of the measurement light Lme1' is reflected by the optical film and the rest is transmitted through the optical film. Furthermore, part of the reference light Lref is reflected by the optical film and the rest is transmitted through the optical film.

Both of the measurement light Lme1' and the reference light Lref reflected by the second beam splitter 5 are incident on the photodetector 6. Furthermore, as described above, the measurement light Lme2' transmitted through the second beam splitter 5 is incident on the photodetector 6.

Thus, the measurement light Lme1', the measurement light Lme2', and the reference light Lref are incident on the photodetector 6. The measurement light Lme1' and the reference light Lref form first interference fringes. The measurement light Lme2' and the reference light Lref form second interference fringes. As a result, it is possible to detect the first interference fringes and the second interference fringes.

However, when the measurement light Lme1' is incident on the photodetector 6, incidence of the measurement light Lme2' on the photodetector 6 may be blocked. Conversely, when the measurement light Lme2' is incident on the photodetector 6, incidence of the measurement light Lme1' on the photodetector 6 may be blocked. In this case, it is possible to separately detect the first interference fringes and the second interference fringes.

For example, light-shielding members are disposed in both the measurement optical path OPm and the measurement optical path OPm2. One of the light-shielding members is positioned on the outside of the measurement optical path OPm, and the other light-shielding member is positioned on the measurement optical path OPm2. By doing so, it is possible to detect only the first interference fringes. Alternatively, one of the light-shielding members is positioned on the measurement optical path OPm, and the other light-shielding member is positioned on the outside of the measurement optical path OPm2. By doing so, it is possible to detect only the second interference fringes.

It is possible to acquire the scattering potential by analyzing the first interference fringes and the second interference fringes. A refractive index is obtained from the scattering potential.

In the data acquisition apparatus 1, the contour of the sample in the z direction is not so clear as the contour of the sample in the x direction even in FIG. 6D in which the contour of the sample is clear.

The relation between the scattering potential and the acquisition range of the scattering potential is illustrated in FIG. 12A, FIG. 12B, and FIG. 12C. FIG. 12A is a diagram illustrating the scattering potential, FIG. 12B is a diagram illustrating the acquisition range of the scattering potential, and FIG. 12C is a diagram illustrating the acquired scattering potential.

As illustrated in FIG. 12A, the scattering potential is distributed in the fx direction and fz direction. On the other hand, as illustrated in FIG. 12B, the acquisition range of the scattering potential is also distributed in the fx direction and the fz direction.

However, in the fz direction, a region 110 is present on the fz axis and in the vicinity thereof (hereinafter referred to as "the vicinity of the fz axis"). There is no spherical shell of the Ewald sphere in the region 110. Therefore, it is not possible to acquire the scattering potential in the region 110. The region 110 indicates a range in which it is not possible to acquire the scattering potential.

As just described, in the fz direction, there is a region in which it is not possible to acquire the scattering potential in the vicinity of the fz axis. Therefore, as illustrated in FIG. 12C, the scattering potential can not be acquired in the vicinity of the fz axis.

In comparison, in the data acquisition apparatus 100, the measurement optical path OPm and another measurement optical path are provided. The region 110 is produced both when the sample is irradiated with measurement light through the measurement optical path and when the sample is irradiated with measurement light through the other measurement optical path.

Figure 13A:
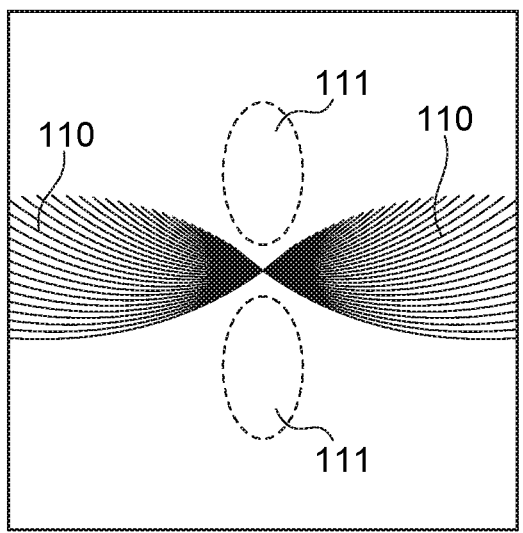
FIG. 13A, FIG. 13B, and FIG. 13C are diagrams illustrating an acquisition range of the scattering potential in the data acquisition apparatus of the present embodiment.
Figure 13B:
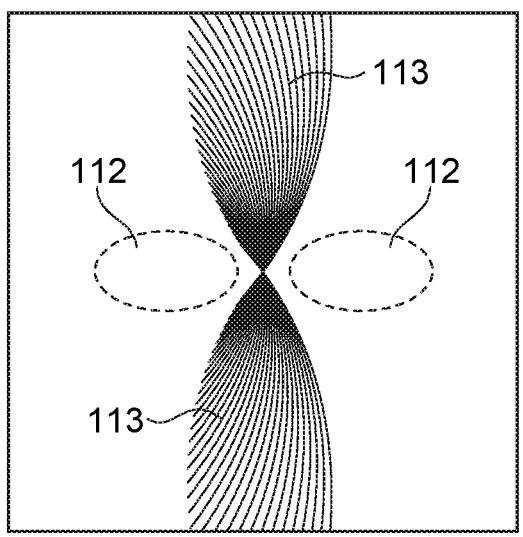
Figure 13C:
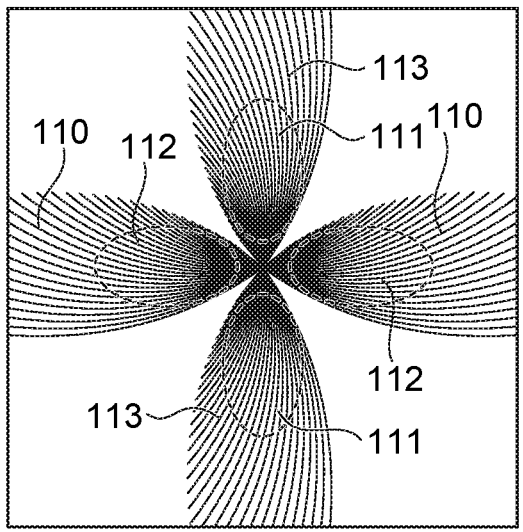

The acquisition range of the scattering potential in the data acquisition apparatus 100 is illustrated in FIG. 13A, FIG. 13B, and FIG. 13C. FIG. 13A is a diagram illustrating the acquisition range of the scattering potential in the measurement optical path, FIG. 13B is a diagram illustrating the acquisition range of the scattering potential in another measurement optical path, and FIG. 13C is a diagram illustrating the acquisition range of the scattering potential obtained with two optical paths.

In the measurement optical path OPm, the sample is irradiated with measurement light from the z direction. Therefore, as illustrated in FIG. 13A, a region 110 is positioned in the fx direction, and a region 111 is positioned in the fz direction. The region 110 is a region in which it is possible to acquire the scattering potential. The region 111 is a region in which it is not possible to acquire the scattering potential.

The measurement optical path OPm2 intersects the measurement optical path OPm. When the measurement optical path OPm and the measurement optical path OPm2 are orthogonal to each other, the sample is irradiated with measurement light from the x direction in the measurement optical path OPm2. Therefore, as illustrated in FIG. 13B, a region 112 is positioned in the fx direction and a region 113 is positioned in the fz direction. The region 112 is a region in which it is not possible to acquire the scattering potential. The region 113 is a region in which it is possible to acquire the scattering potential.

FIG. 13C is a diagram illustrating the acquisition range of the scattering potential obtained with the measurement optical path OPm and the measurement optical path OPm2. FIG. 13C is a diagram in which FIG. 13A and FIG. 13B are superimposed.

The region 111 is a region in which it is not possible to acquire the scattering potential with the measurement optical path OPm. However, as illustrated in FIG. 13C, the region 113 in the measurement optical path OPm2 is positioned in the region 111 in the measurement optical path OPm. Thus, with the measurement optical path OPm2, it is possible to acquire the scattering potential that is not possible to be acquired with measurement optical path OPm.

The relation between the acquisition range of the scattering potential and the shape of the sample is illustrated in FIG. 14A, FIG. 14B, FIG. 14C, and FIG. 14D. FIG. 14A is a diagram illustrating the acquisition range of the scattering potential in one measurement optical path, FIG. 14B is a diagram illustrating the acquisition range of the scattering potential in two measurement optical paths, FIG. 14C is a diagram illustrating the shape of the sample with one measurement optical path, and FIG. 14D is a diagram illustrating the shape of the sample with two measurement optical paths.

Both of the shape of the sample illustrated in FIG. 14C and the shape of the sample illustrated in FIG. 14D are shapes obtained by calculation. The scattering potential is used in this calculation.

FIG. 14A illustrates the acquisition range of the scattering potential when only the measurement optical path OPm is used. In this case, the acquisition range of the scattering potential extends in the fx direction.

FIG. 14B illustrates the acquisition range of the scattering potential when the measurement optical path OPm and the measurement optical path OPm2 are used. In this case, the acquisition range of the scattering potential extends in the fx direction as well as in the vicinity of the fz axis. Thus, when two measurement optical paths are used, it is possible to reduce the range in which it is not possible to acquire the scattering potential, compared with when only one measurement optical path is used.

Based on the comparison between FIG. 14C and FIG. 14D, it can be understood that the shape of the sample is clearer as there are fewer ranges in which it is not possible to acquire the scattering potential. In particular, the contour of the sample in the z direction is clearer in FIG. 14D than in FIG. 14C. As just described, it can be understood that as there are fewer ranges in which it is not possible to acquire the scattering potential, the refractive index can be calculated more accurately.

In the data acquisition apparatus 100, there are fewer ranges in which it is not possible to acquire the scattering potential. Thus, in the data acquisition apparatus of the present embodiment, it is possible to accurately calculate the refractive index. Therefore, for example, it is possible to make the contour of the sample clear even when the sample is colorless transparent. As a result, it is possible to accurately grasp the sample shape.

It is preferable that the data acquisition apparatus of the present embodiment include a computing unit, and the computing unit determine a scattering potential of a sample from data acquired with a first measurement optical path and data acquired with a second measurement optical path, and calculate a refractive index distribution in the sample based on the scattering potential of the sample.

According to the present disclosure, it is possible to provide a data acquisition apparatus capable of calculating a refractive index at a high accuracy even in a compact size.

As described above, the present disclosure is useful for a data acquisition apparatus capable of calculating a refractive index at a high accuracy even in a compact size.

What is claimed is:

1. A data acquisition apparatus comprising:
an illumination device;
a first beam splitter;
a measurement unit; and
a photodetector, wherein
a measurement optical path and a reference optical path are positioned between the illumination device and the photodetector,
the first beam splitter has an optical surface in which an optical film is formed,
in the first beam splitter, light traveling in a first direction and light traveling in a second direction are generated from incident light by the optical film,
the measurement optical path is positioned in the first direction,
the reference optical path is positioned in the second direction,
the measurement unit is disposed on the measurement optical path,
in the optical surface of the first beam splitter, an incident position of light emitted from the illumination device changes with time, and
with change in the incident position, an angle formed by light traveling through the measurement optical path and an optical axis of the measurement optical path changes.

2. The data acquisition apparatus according to claim 1, further comprising a second beam splitter, wherein
the second beam splitter has an optical surface in which an optical film is formed,
light traveling in the first direction is measurement light, and light traveling in the second direction is reference light,
the second beam splitter is disposed at a position where the measurement optical path and the reference optical path intersect with each other,
the measurement light and the reference light are incident on the second beam splitter, and
the measurement light and the reference light are emerged from the second beam splitter toward the photodetector.

3. The data acquisition apparatus according to claim 1, wherein
the measurement light and the reference light are incident on the photodetector, and
an incident angle of the measurement light on the photodetector is different from an incident angle of the reference light on the photodetector.

4. The data acquisition apparatus according to claim 1, wherein
the illumination device includes a light-emitting portion,
the measurement unit includes an objective lens, and
the light-emitting portion is disposed at a position conjugate to a pupil position of the objective lens.

5. The data acquisition apparatus according to claim 1, wherein
the illumination device includes a plurality of light-emitting portions arranged in an array, and
in the light-emitting portions, emission of light can be controlled independently.

6. The data acquisition apparatus according to claim 1, wherein
the illumination device includes a plurality of light-emitting diodes arranged in an array,
a wavelength selection member is disposed between the illumination device and the first beam splitter, and
the wavelength selection member has an optical characteristic of transmitting light in a certain wavelength range.

7. The data acquisition apparatus according to claim 1, wherein
the following Expression (1) is satisfied:

$$n-m=2x \tag{1}$$

where
n is the number of predetermined positions in the reference optical path,
m is the number of the predetermined positions in the measurement optical path,
the predetermined position is a position conjugate to the illumination device, and
x is an integer.

8. The data acquisition apparatus according to claim 1, further comprising a third beam splitter and another measurement unit, wherein
the third beam splitter is disposed in the first direction,
another measurement optical path is positioned between the third beam splitter and the photodetector,
the third beam splitter has an optical surface in which an optical film is formed,
in the third beam splitter, light traveling in the first direction and light traveling in a third direction are generated from incident light by the optical film,
the other measurement optical path is positioned in the third direction,
the other measurement unit is disposed on the other measurement optical path, and
the measurement optical path and the other measurement optical path intersect with each other.

* * * * *